United States Patent
Lei et al.

(10) Patent No.: US 12,262,422 B2
(45) Date of Patent: Mar. 25, 2025

(54) HARQ PROCEDURE FOR RACH RESPONSE MESSAGE IN TWO-STEP RACH

(71) Applicant: QUALCOMM Incorporated, San Diego, CA (US)

(72) Inventors: Jing Lei, San Diego, CA (US); Yi Huang, San Diego, CA (US); Wanshi Chen, San Diego, CA (US); Linhai He, San Diego, CA (US); Ruiming Zheng, Beijing (CN); Peter Gaal, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 17/635,453

(22) PCT Filed: Aug. 13, 2020

(86) PCT No.: PCT/CN2020/108803
§ 371 (c)(1),
(2) Date: Feb. 15, 2022

(87) PCT Pub. No.: WO2021/031966
PCT Pub. Date: Feb. 25, 2021

(65) Prior Publication Data
US 2022/0272769 A1 Aug. 25, 2022

(30) Foreign Application Priority Data
Aug. 16, 2019 (WO) ................ PCT/CN2019/101168

(51) Int. Cl.
*H04W 74/0833* (2024.01)
*H04L 1/1812* (2023.01)
(Continued)

(52) U.S. Cl.
CPC ....... *H04W 74/0841* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS

2011/0216722 A1* 9/2011 Yang ...................... H04L 1/0073
370/328
2017/0289995 A1* 10/2017 Lin ........................ H04W 72/23
(Continued)

FOREIGN PATENT DOCUMENTS

| CN | 110115096 A | 8/2019 |
|---|---|---|
| WO | 2009088858 A1 | 7/2009 |

(Continued)

OTHER PUBLICATIONS

Taiwan Search Report—TW109127712—TIPO—Nov. 18, 2023.
(Continued)

*Primary Examiner* — The Hy Nguyen
(74) *Attorney, Agent, or Firm* — Patterson & Sheridan LLP

(57) ABSTRACT

Certain aspects of the present disclosure provide techniques for a hybrid automatic repeat request (HARQ) procedure for the random access channel (RACH) response message in a two-step RACH procedure. A method that may be performed by a user equipment (UE) includes sending a RACH message to a base station (BS) during a two-step RACH procedure. The RACH message includes a RACH preamble and a RACH payload. The UE monitors a RACH response message from the BS during a random access response (RAR) window. The UE transmits a retransmission of the RACH message, an acknowledgement (ACK) to the RACH
(Continued)

response message, a negative acknowledgment (NACK) to the RACH response message, or does not transmit, to the BS based on whether a RACH response message carrying a success RAR or a fallback RAR, or no RACH response message, is received from the BS during the window.

22 Claims, 17 Drawing Sheets

(51) Int. Cl.
  *H04L 5/00* (2006.01)
  *H04W 72/1263* (2023.01)
  *H04W 72/23* (2023.01)
  *H04W 74/08* (2009.01)
(52) U.S. Cl.
  CPC ....... *H04W 72/1263* (2013.01); *H04W 72/23* (2023.01); *H04W 74/0866* (2013.01)

(56) References Cited

U.S. PATENT DOCUMENTS

| | | | |
|---|---|---|---|
| 2018/0027537 A1 | 1/2018 | Yang | |
| 2018/0124822 A1 | 5/2018 | Wang et al. | |
| 2018/0139787 A1 | 5/2018 | Islam et al. | |
| 2018/0295541 A1 | 10/2018 | Hall et al. | |
| 2019/0159249 A1* | 5/2019 | Ahn | H04W 56/00 |
| 2020/0107371 A1* | 4/2020 | Kunt | H04W 74/0833 |
| 2021/0329704 A1* | 10/2021 | Yang | H04W 72/23 |
| 2021/0385854 A1* | 12/2021 | Wu | H04W 74/02 |
| 2022/0046717 A1* | 2/2022 | Zhang | H04L 1/1861 |
| 2022/0053568 A1* | 2/2022 | Xing | H04L 5/0055 |
| 2022/0086824 A1* | 3/2022 | Kundu | H04L 5/0053 |
| 2022/0183071 A1 | 6/2022 | Liu | |
| 2022/0225428 A1* | 7/2022 | Xiong | H04L 1/1864 |
| 2022/0264653 A1* | 8/2022 | Xiong | H04W 74/0833 |
| 2022/0279559 A1* | 9/2022 | Wong | H04L 5/0053 |
| 2022/0287107 A1* | 9/2022 | Kim | H04W 72/0446 |
| 2022/0377801 A1 | 11/2022 | Lei et al. | |
| 2023/0413277 A1* | 12/2023 | Park | H04L 5/0057 |
| 2024/0284494 A1* | 8/2024 | Kim | H04W 72/569 |

FOREIGN PATENT DOCUMENTS

| | | | | |
|---|---|---|---|---|
| WO | 2016175981 | A1 | 11/2016 | |
| WO | WO-2017217400 | A1 * | 12/2017 | ............ H04L 27/26 |
| WO | 2018089265 | | 5/2018 | |
| WO | 2019036150 | A1 | 2/2019 | |

OTHER PUBLICATIONS

Ericsson: "Configuration of 2-step RA", 3GPP TSG-RAN WG2 RAN2#107, R2-1909936, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 15, 2019, pp. 1-5, XP051767727, The Whole Document.
Ericsson: "Fallback for 2-step RA", 3GPP TSG-RAN WG2 #107, R2-1909934, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 15, 2019, 4 Pages, XP051767725, The Whole Document.
Huawei: "Feature Lead Summary of HARQ Enhancements for NR-U", 3GPP TSG RAN WG1 Meeting #97, R1-1907652, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 16, 2019, pp. 1-22, XP051739941, Section 1, Section 2.1.3.
Mediatek Inc: "RNTI and HARQ Aspects of 2-Step RACH", 3GPP TSG-RAN WG2 Meeting #106, R2-1907073, 3rd Generation Partnership Project (3GPP), Mobile Competence Centre, 650, Route Des Lucioles, F-06921, Sophia-Antipolis Cedex, France, vol. RAN WG2, No. Reno, USA, May 13, 2019-May 17, 2019, May 13, 2019, 2 Pages, XP051730523, The Whole Document.
Supplementary European Search Report—EP20854283—Search Authority—The Hague—Jul. 28, 2023.
Nokia, et al., "Feature Lead's Summary on Channel Access Procedures", 3GPP TSG RAN WG1 Meeting #96bis, R1-1904187, Xian, China, Apr. 8-12, 2019, 20 Pages.
Nokia., et al., "2-Step RACH Procedure Feature Lead Summary", R1-1905670, FF3GPP TSG RAN WG1 #96bis, Xi'an, China, Apr. 8-Apr. 12, 2019, pp. 1-92.
Qualcomm Incorporated: "Channel Structure for Two-Step RACH", 3GPP Draft, R1-1907691, 3GPP TSG-RAN WG1 Meeting #97, Channel Structure for Two-Step RACH, 3rd Generation Partnership Project (3GPP), Mobile Competence Centre, 650, Route Des Lucioles, F-06921, Sophia-Antipolis, Cedex, France, vol. RAN WG1, No. Reno, USA, May 13, 2019-May 17, 2019, May 16, 2019 (May 16, 2019), XP051739977, pp. 1-20.
International Search Report and Written Opinion—PCT/CN2019/101168—ISAEPO—May 19, 2020.
International Search Report and Written Opinion—PCT/CN2020/108803—ISAEPO—May 19, 2020.
Nokia et al., "Feature Lead Summary#2 on 2 Step RACH Procedures", 3GPP TSG RAN WG1 #97, R1-1907838, Reno, USA, May 13-17, 2019, pp. 1-56 (p. 4 Offline Proposal 3.1.1, p. 5, pp. 11-12 Offline Proposal 3.6.1).
Nokia et al., "Feature Lead Summary#3 on 2 Step RACH Procedures", 2-STEP RACH Procedure Feature Lead Summary RAN1#97, 3GPP TSG RAN WG1 #97, R1-1907900, Reno, USA, May 13, 2019-May 17, 2019, May 17, 2019 (May 17, 2019), XP051740159, pp. 1-59, Retrieved from the Internet: URL: http://www.3gpp.org/ftp/tsg%5Fran/WG1%5FRL1/TSGR1%5F97/Docs/R1%2D1907900%2Ezip.
Nokia, et al., "On 2-Step RACH Procedure", 3GPP Draft, 3GPP TSG RAN WG1 #97, R1-1906747, On 2-Step RACH Procedure, 3rd Generation Partnership Project (3GPP), Mobile Competence Centre, 650, Route Des Lucioles, F-06921 Sophia-Antipolis Cedex, France, vol. Ran WG1, No. Reno, USA, May 13, 2019-May 17, 2019, May 13, 2019 (May 13, 2019), XP051728198, 23 Pages, Retrieved from the Internet: URL: http://www.3gpp.org/ftp/Meetings%5F3GPP%5FSYNC/RAN1/Docs/R1%2D1906747%2Ezip, [retrieved on May 13, 2019], Sections 1-2, Sections 2.1, 2.4, Sections.
Qualcomm Incorporated: "Procedures for Two-Step RACH", 3GPP TSG-RAN WG1 Meeting #97, R1-1907256, 3GPP Draft, R1-1907256 Procedures for Two-Step Rach, 3rd Generation Partnership Project(3GPP), Mobile Competence Centre, 650, Route Des Lucioles, F-06921 Sophia-AntipolisCedex, France, vol. RAN WG1, May 13, 2019- May 17, 2019, Reno, USA, May 17, 2019 (May 17, 2019), pp. 1-13, XP051728696, Retrieved from the Internet: URL: http://www.3gpp.org/ftp/Meetings%5F3GPP%5FSYNC/RAN1/Docs/R1%2D1907256%2Ezip. [retrieved on May 13, 2019].

* cited by examiner

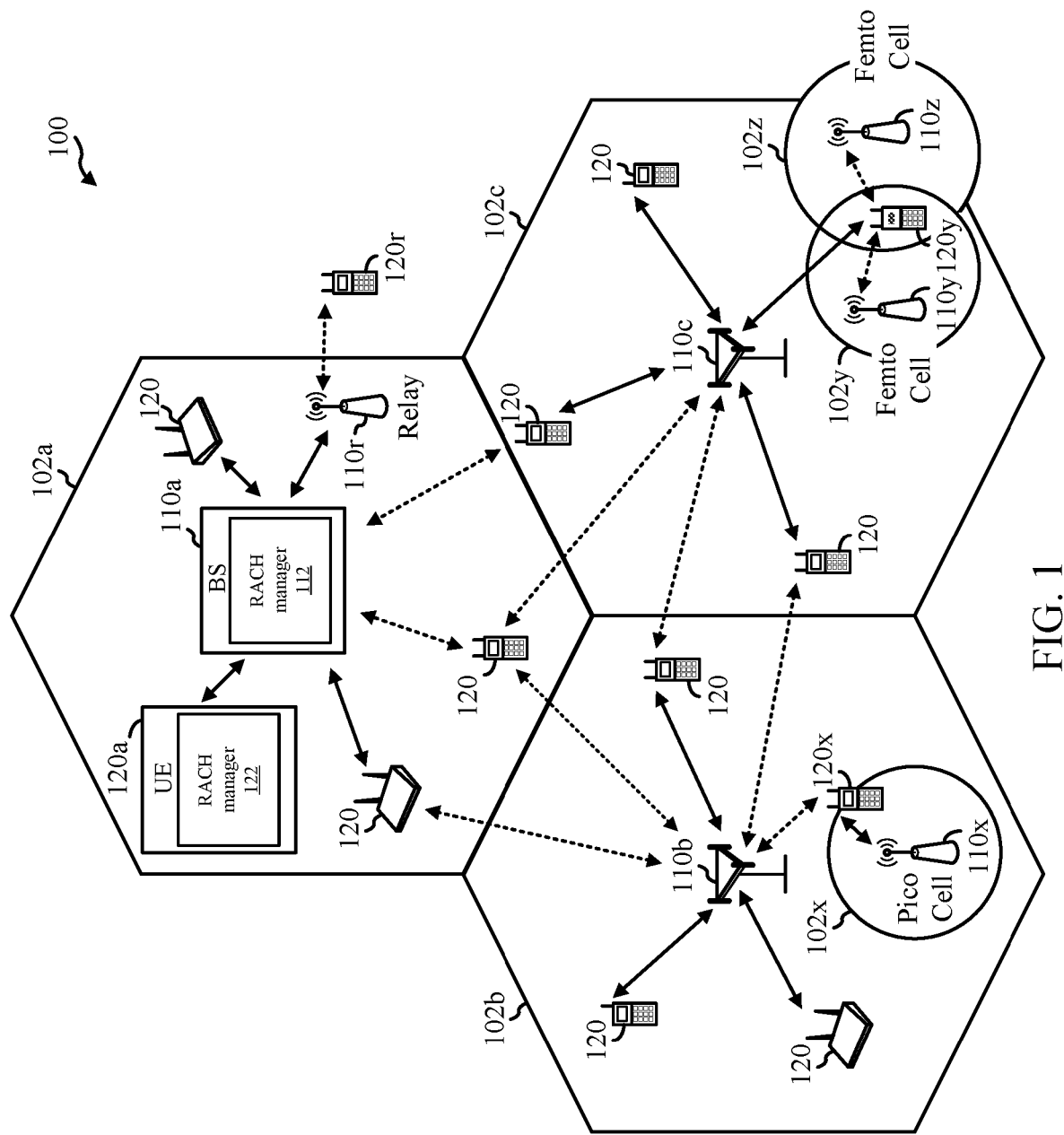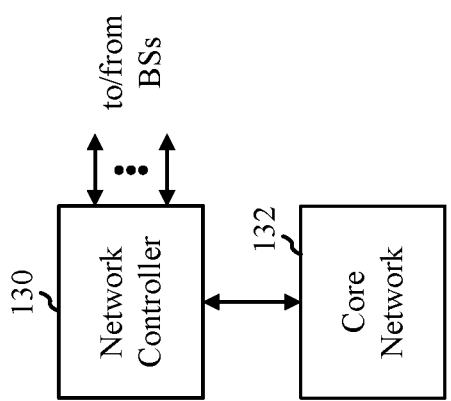
FIG. 1

| RRC State | Successful Decoding of msgA Payload | | Successful Decoding of msgA Preamble Only | |
|---|---|---|---|---|
| | MsgB PDCCH | MsgB PDSCH | MsgB PDCCH | MsgB PDSCH |
| Connected | • DL assignment for MsgB PDSCH<br>• PUCCH resource for HARQ<br>• 1-bit Flag for C-RNTI (set to "1") | • TAC<br>• RRC message (optional)<br>• UL grant for new data (optional) | • DL assignment for msgB PDSCH | • Fallback RAR<br>  RAR grant for PUSCH retx<br>  TC-RNTI<br>  RAPID<br>• TAC |
| Inactive or Idle | • DL assignment for MsgB PDSCH<br>• PUCCH resource for HARQ<br>• 1-bit Flag for C-RNTI (set to "0") | • SuccessRAR<br>  Contention resolution ID<br>  C-RNTI<br>• TAC<br>• RRC message (optional)<br>• UL grant for new data (optional) | | |

FIG. 8

| RRC State | Successful Decoding of msgA Payload | | Successful Decoding of msgA Preamble Only | | Failure to Detect Preamble |
|---|---|---|---|---|---|
| | MsgB PDCCH | MsgB PDSCH | MsgB PDCCH | MsgB PDSCH | |
| Connected | • DL assignment for MsgB PDSCH<br>• PUCCH resource for HARQ | • TAC<br>• RRC message (optional)<br>• UL grant for new data (optional) | | | DTX or transmit a BI in a PDSCH MAC subheader |
| Inactive or Idle | • DL assignment for MsgB PDSCH | • SuccessRAR<br>  Contention resolution ID<br>  C-RNTI<br>• TAC<br>• PUCCH resource for HARQ<br>• RRC message (optional)<br>• UL grant for new data (optional) | DL assignment for msgB PDSCH | • Fallback RAR<br>  RAR grant for PUSCH retx<br>  TC-RNTI<br>  RAPID<br>• TAC | |

FIG. 9

HARQ PROCEDURE FOR RACH RESPONSE MESSAGE IN TWO-STEP RACH

CROSS-REFERENCE TO RELATED APPLICATION(S)

This application is a national stage application under 35 U.S.C. 371 of PCT/CN2020/108803, filed Aug. 13, 2020, which claims benefit of and priority to International Application No. PCT/CN2019/101168, filed Aug. 16, 2019, which are hereby assigned to the assignee hereof, and hereby expressly incorporated by reference herein in their entirety as if fully set forth below and for all applicable purposes.

BACKGROUND

Field of the Disclosure

Aspects of the present disclosure relate to wireless communications, and more particularly, to techniques for a hybrid automatic repeat request (HARQ) procedure for the random access channel (RACH) response message in a two-step RACH procedure.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved random access procedures.

Certain aspects provide a method for wireless communication by a user equipment (UE). The method generally includes sending a random access channel (RACH) message to a base station (BS) during a two-step RACH procedure. The RACH message includes a RACH preamble and a RACH payload. The method generally includes monitoring a RACH response message from the BS during a random access response (RAR) window. The method generally includes transmitting a retransmission of the RACH message, an acknowledgement (ACK) to the RACH response message, a negative acknowledgment (NACK) to the RACH response message, or not transmitting, to the BS based on whether a RACH response message carrying a success RAR or fallback RAR, or no RACH response message, is received from the BS during the RAR window.

Certain aspects provide a method for wireless communication by a BS. The method generally includes transmitting a RACH response message to a UE in a RAR window during a two-step RACH procedure. The RACH response message includes a success RAR or a fallback RAR. The method generally includes receiving a retransmission of a RACH message, an ACK to the RACH response message, a NACK to the RACH response message, or nothing, from the UE based on the RACH response message.

Certain aspects provide an apparatus for wireless communication. The apparatus generally includes at least one processor and a memory coupled to the at least one processor. The memory includes code executable by the at least one processor to cause the apparatus to send a RACH message to a BS during a two-step RACH procedure. The RACH message includes a RACH preamble and a RACH payload. The memory includes code executable by the at least one processor to cause the apparatus to monitor a RACH response message from the BS during a RAR window. The memory includes code executable by the at least one processor to cause the apparatus to transmit a retransmission of the RACH message, an ACK to the RACH response message, a NACK to the RACH response message, or not transmit, to the BS based on whether a RACH response message carrying a success RAR or fallback RAR, or no RACH response message, is received from the BS during the RAR window.

Certain aspects provide an apparatus for wireless communication. The apparatus generally includes at least one processor and a memory coupled to the at least one processor. The memory includes code executable by the at least one processor to cause the apparatus to transmit a RACH response message to a UE in a RAR window during a two-step RACH procedure. The RACH response message includes a success RAR or a fallback RAR. The memory includes code executable by the at least one processor to cause the apparatus to receive a retransmission of a RACH message, an ACK to the RACH response message, a NACK to the RACH response message, or nothing, from the UE based on the RACH response message.

Certain aspects provide an apparatus for wireless communication. The apparatus generally includes means for sending a RACH message to a BS during a two-step RACH procedure. The RACH message includes a RACH preamble and a RACH payload. The apparatus generally includes means for monitoring a RACH response message from the BS during a RAR window. The apparatus generally includes means for transmitting a retransmission of the RACH message, an ACK to the RACH response message, a NACK to the RACH response message, or not transmitting, to the BS based on whether a RACH response message carrying a success RAR or fallback RAR, or no RACH response message, is received from the BS during the RAR window.

Certain aspects provide an apparatus for wireless communication. The apparatus generally includes means for transmitting a RACH response message to a UE in a RAR window during a two-step RACH procedure. The RACH response message includes a success RAR or a fallback RAR. The apparatus generally includes means for receiving a retransmission of a RACH message, an ACK to the RACH response message, a NACK to the RACH response message, or nothing, from the UE based on the RACH response message.

Certain aspects provide a computer readable medium storing computer executable code thereon for wireless communication. The computer readable medium generally includes code for sending a RACH message to a BS during a two-step RACH procedure. The RACH message includes a RACH preamble and a RACH payload. The computer readable medium generally includes code for monitoring a RACH response message from the BS during a RAR window. The computer readable medium generally includes code for transmitting a retransmission of the RACH message, an ACK to the RACH response message, a NACK to the RACH response message, or not transmitting, to the BS based on whether a RACH response message carrying a success RAR or fallback RAR, or no RACH response message, is received from the BS during the RAR window.

Certain aspects provide a computer readable medium storing computer executable code thereon for wireless communication. The computer readable medium generally includes code for transmitting a RACH response message to a UE in a RAR window during a two-step RACH procedure. The RACH response message includes a success RAR or a fallback RAR. The computer readable medium generally includes code for receiving a retransmission of a RACH message, an ACK to the RACH response message, a NACK to the RACH response message, or nothing, from the UE based on the RACH response message.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 1 is a block diagram conceptually illustrating an example telecommunications system, in accordance with certain aspects of the present disclosure.

FIG. 8 is a table showing MSG A content for a unicast mode, in accordance with certain aspects of the present disclosure.

FIG. 9 is a table showing MSG A content for a multicast mode, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 2:
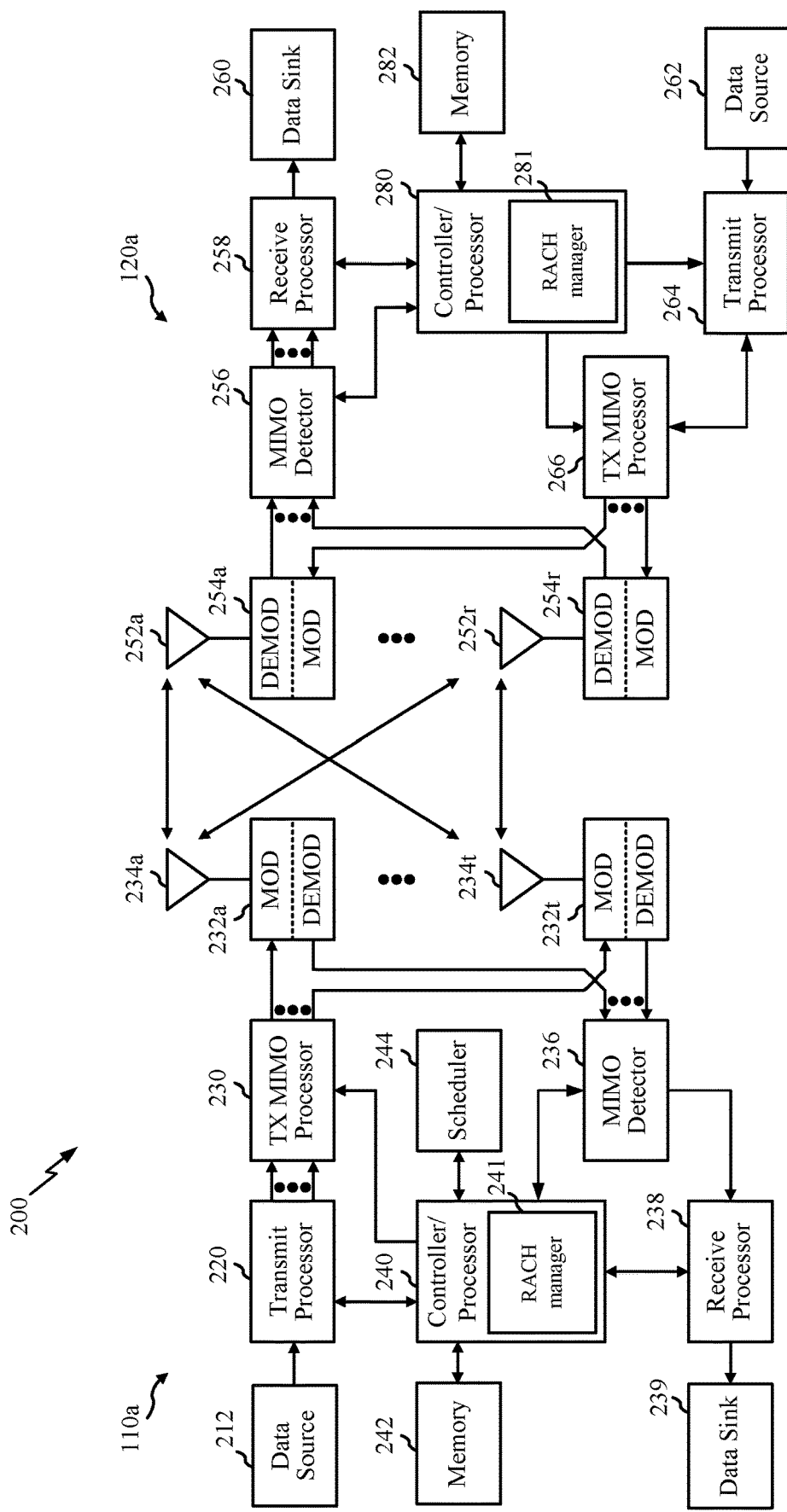
FIG. 2 is a block diagram conceptually illustrating a design of an example a base station (BS) and user equipment (UE), in accordance with certain aspects of the present disclosure.

Aspects of the present disclosure provide apparatus, methods, processing systems, and computer readable mediums for a hybrid automatic repeat request (HARQ) procedure for the random access channel (RACH) response message in a two-step RACH procedure. In a two-step RACH procedure, a user equipment (UE) sends a base station (BS) a RACH message (e.g., referred to as MSG A)

that includes a RACH preamble and a RACH payload. The BS can respond with a RACH response message (e.g., referred to as MSG B) that includes a physical downlink control channel (PDCCH) transmission and a physical downlink shared channel (PDSCH) transmission.

Aspects of the present disclosure provide for a HARQ procedure for the RACH response message in a two-step RACH procedure. For example, the UE can provide HARQ feedback, or not transmit, or send a RACH message retransmission, based on whether the RACH response message is received and, if received, whether the RACH response message includes a fallback random access response (RAR) or a success RAR.

The following description provides examples of a configurable mode for a response to random access message in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120. The UEs 120 may be dispersed throughout the wireless communication network 100, and each UE 120 may be stationary or mobile.

According to certain aspects, the BSs 110 and UEs 120 may be configured for a HARQ procedure for the RACH response message in a two-step RACH procedure. As shown in FIG. 1, the BS 110a includes a RACH manager 112. The RACH manager 112 may be configured to transmit a RACH response message to a UE in a RAR window during a two-step RACH procedure, the RACH response message including a success RAR or a fallback RAR; and receive a retransmission of a RACH message, an ACK to the RACH response message, a NACK to the RACH response message, or nothing, from the UE based on the RACH response message, in accordance with aspects of the present disclosure. As shown in FIG. 1, the UE 120a includes a RACH manager 122. The RACH manager 122 may be configured to send a RACH message to a BS during a two-step RACH procedure, the RACH message including a RACH preamble and a RACH payload; monitor a RACH response message from the BS during a RAR window; and transmit a retransmission of the RACH message, an ACK to the RACH response message, a NACK to the RACH response message, or DTX, to the BS based on whether a RACH response message carrying a success RAR or fallback RAR, or no RACH response message, is received from the BS during the RAR window, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a RACH manager 241 that may be configured for a HARQ procedure for the RACH response message in a two-step RACH procedure, according to aspects described herein. As shown in FIG. 2, the controller/processor 280 of the UE 120a has a RACH manager 241 that may be configured for a HARQ procedure for the RACH response message in a two-step RACH procedure, according to aspects described herein. Although shown at the Controller/Processor, other components of the UE 120a and BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
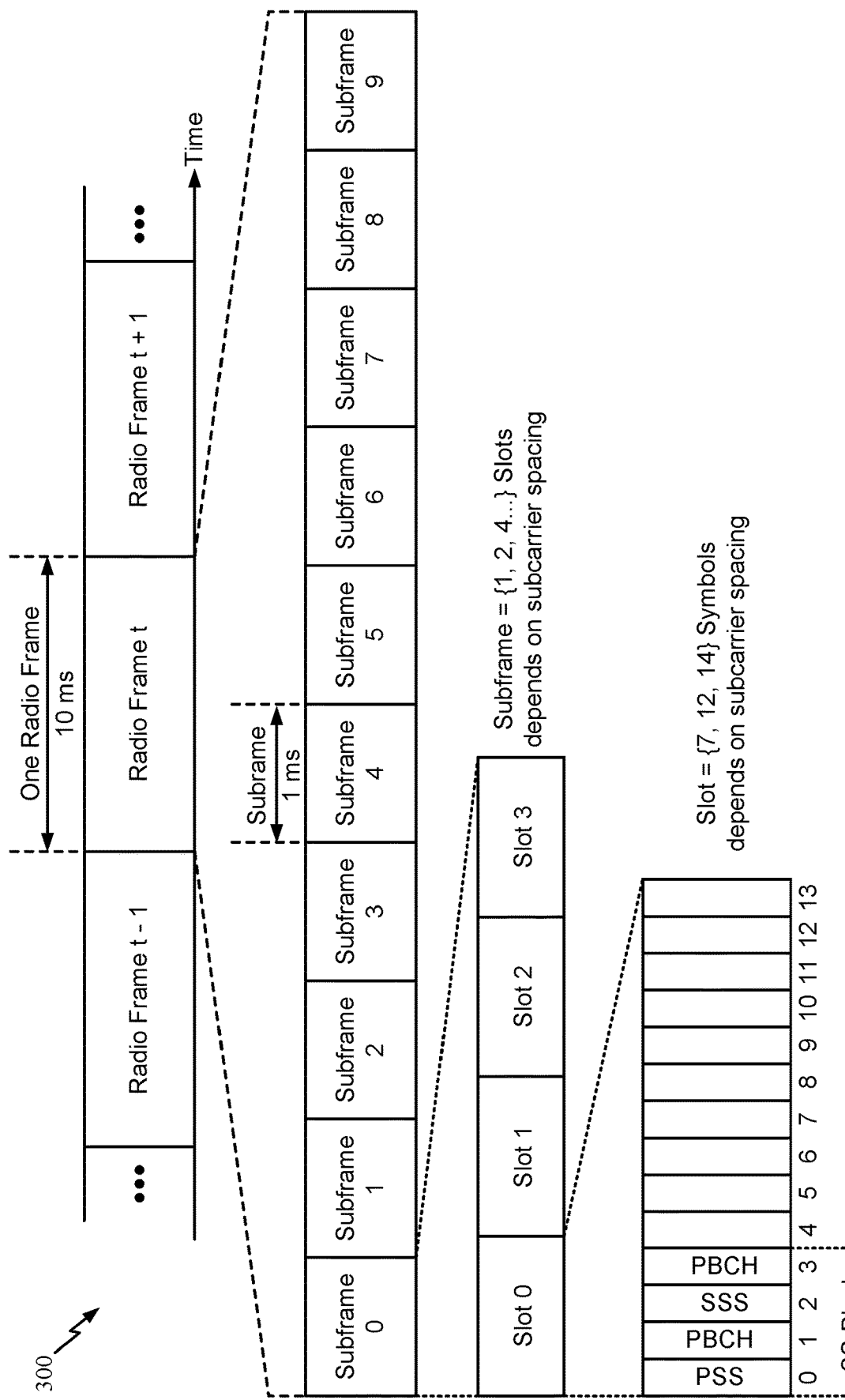
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As mentioned above, aspects of the disclosure relate to a hybrid automatic repeat request (HARM) procedure for a two-step random access channel (RACH) procedure. RACH refers to a wireless channel (medium) that may be shared by multiple UEs, and may be used by the UEs to (randomly) access the network for communications. For example, the RACH may be used for call setup and to access the network for data transmissions. In some cases, RACH may be used for initial access to a network when the UE switches from a RRC connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 4:
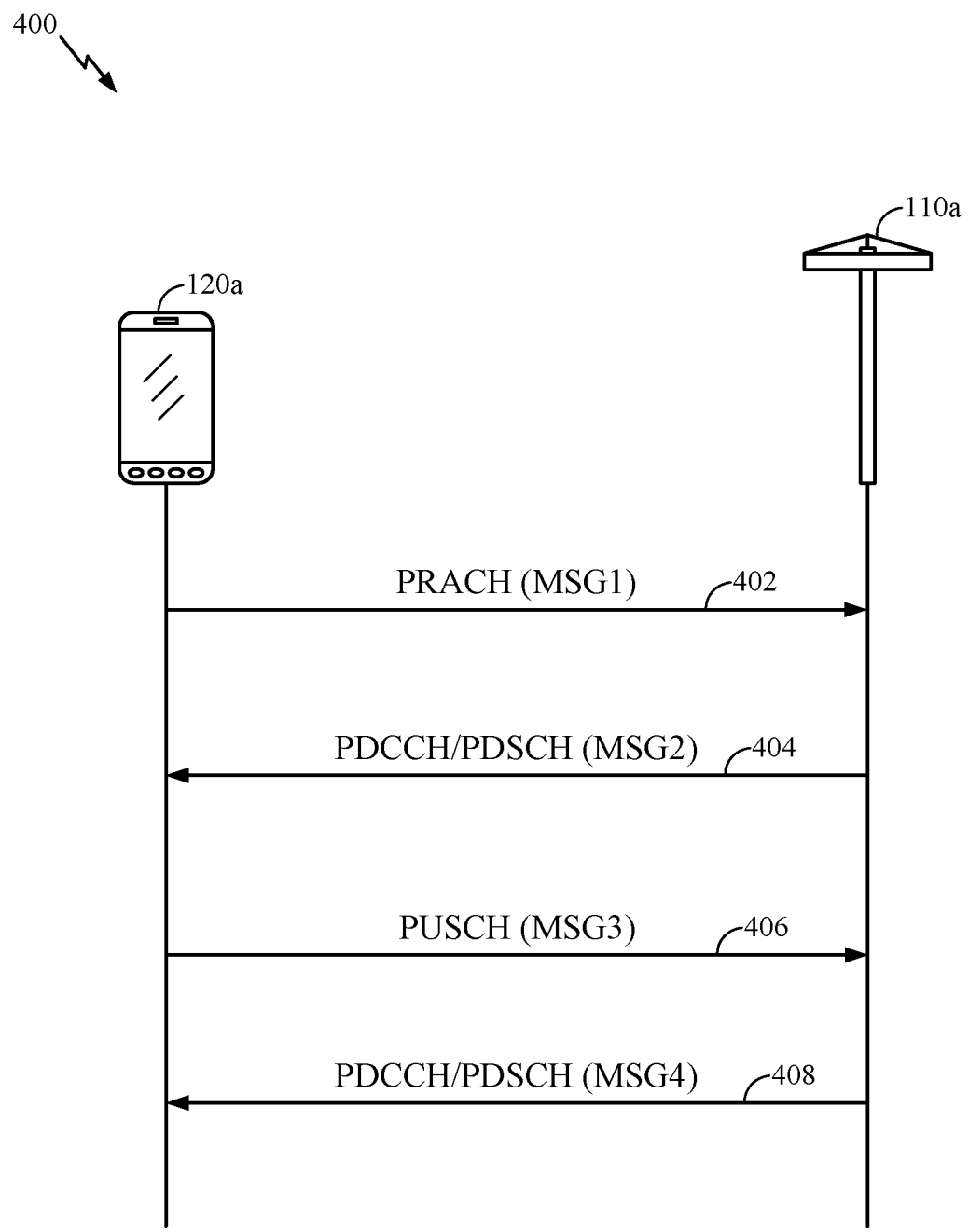
FIG. 4 is a timing diagram illustrating an example four-step random access channel (RACH) procedure, in accordance with certain aspects of the present disclosure.

FIG. 4 is a timing (or "call-flow") diagram 400 illustrating an example four-step RACH procedure. A first message (MSG1) may be sent from the UE 120a to BS 110a on the physical random access channel (PRACH), at 402. In the four-step RACH procedure, the MSG1 may only include a RACH preamble. BS 110a may respond with a random access response (RAR) message (MSG2) which may include the identifier (ID) of the RACH preamble, a timing advance (TA), an uplink grant, a cell radio network temporary identifier (C-RNTI), and/or a back off indicator, at 404. MSG2 may include a PDCCH communication including control information for a following communication on the PDSCH, as illustrated. In response to the MSG2, the UE 120a transmits MSG3 to the BS 110a on the PUSCH, at 406. The MSG3 may include one or more of a RRC connection request, a tracking area update (TAU) request, a system information request, a positioning fix or positioning signal request, or a scheduling request. The BS 110a then responds with the MSG 4 which may include a contention resolution message, at 408.

In some cases, to speed up access, a two-step RACH procedure may be supported. As the name implies, the two-step RACH procedure may effectively "collapse" the four messages of the four-step RACH procedure into two messages. There are several benefits to a two-step RACH procedure, such as speed of access and the ability to send a relatively small amount of data without the overhead of a full four-step RACH procedure to establish a connection (when the four-step RACH messages may be larger than the payload). The two-step RACH procedure can operate in any RRC state and any supported cell size. Networks that use two-step RACH procedures can typically support contention-based random access (CBRA) transmission of messages (e.g., MSG A) within a finite range of payload sizes and with a finite number of modulation coding scheme (MCS) levels.

Figure 5:
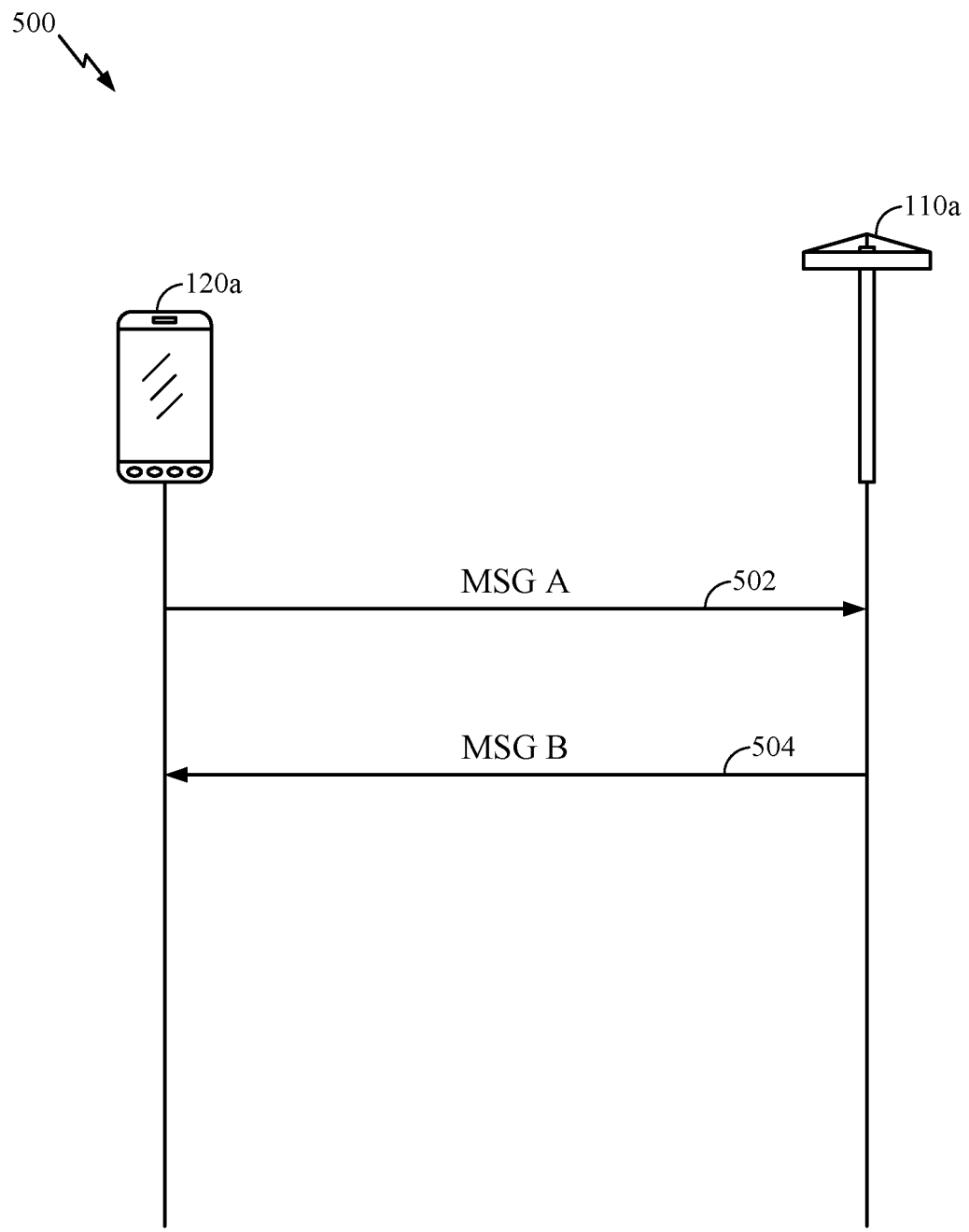
FIG. 5 is a timing diagram illustrating an example two-step RACH procedure, in accordance with certain aspects of the present disclosure.

FIG. 5 is a timing diagram 500 illustrating an example two-step RACH procedure, in accordance with certain aspects of the present disclosure. In the two-step RACH procedure, a first message (MSG A) may be sent from the UE 120a to BS 110a, at 502. The MSG A may include some or all the information from both the MSG1 and MSG3 from the four-step RACH procedure (effectively combining MSG1 and MSG3). For example, MSG A may include MSG1 and MSG3 multiplexed together such as using one of time-division multiplexing (TDM) or frequency-division multiplexing (FDM). The MSG A may include a RACH preamble for random access and a payload. The MSG A payload, for example, may include the UE-ID and other signaling information (e.g., buffer status report (BSR) or scheduling request (SR)). BS 110a may respond with a RAR message (MSG B), at 504, which may effectively combine the MSG2 and MSG4 of the four-step RACH procedure described above. For example, MSG B may include the ID of the RACH preamble (RAPID), a timing advance (TA), a back off indicator, a contention resolution message, UL/DL grant, and/or transmit power control (TPC) commands.

Figure 6:
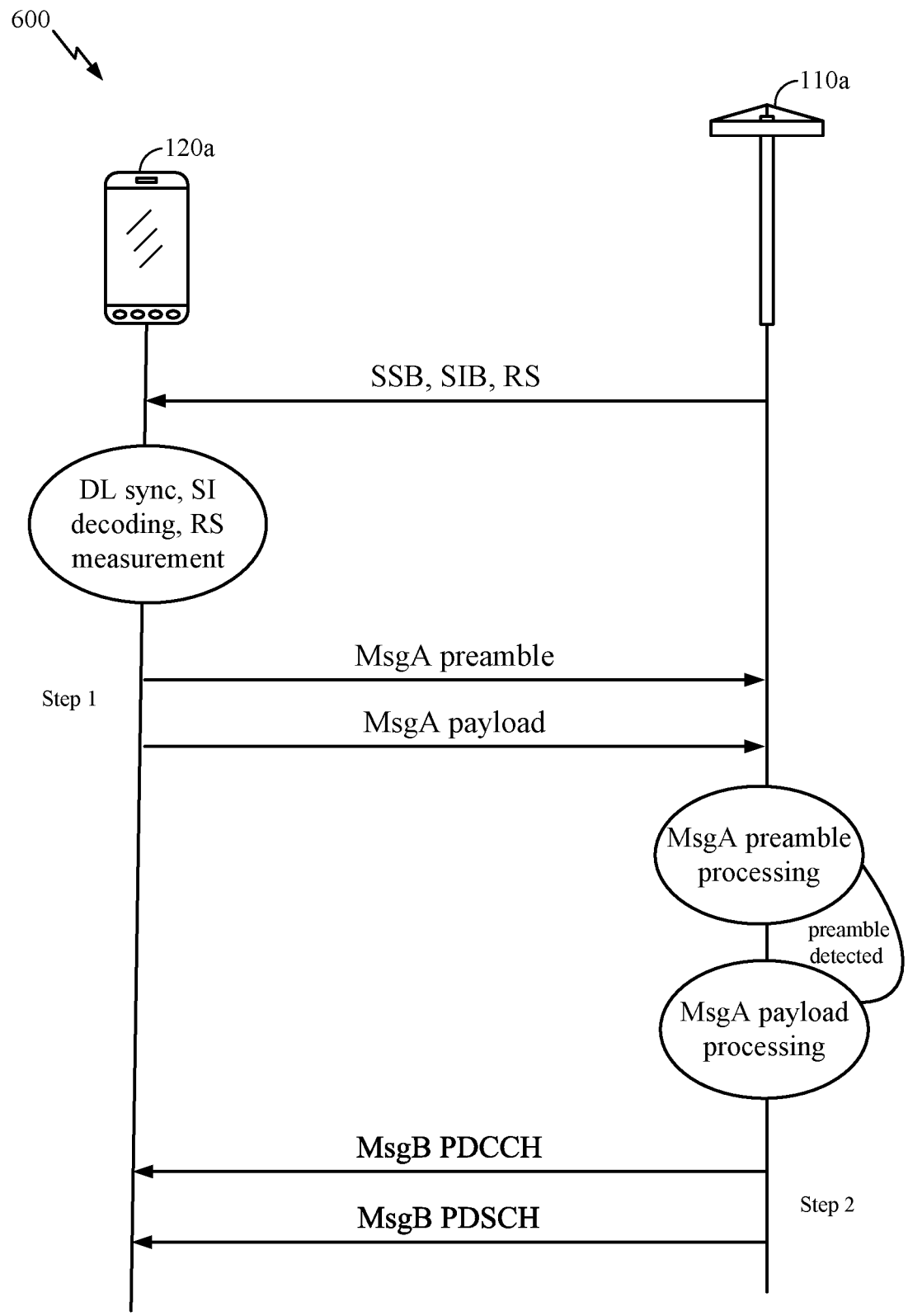
FIG. 6 is a timing diagram illustrating an example two-step RACH procedure, in accordance with certain aspects of the present disclosure.

FIG. 6 is a timing diagram illustrating a more detailed example of the two-step RACH procedure, in accordance with certain aspects of the present disclosure. As shown in FIG. 6, the UE may receive information from the BS, such as a SSB, system information block (SIB), and/or reference signal (RS) prior to the RACH procedure, which may be used by the UE 120a to perform the RACH procedure with the BS 110a. As shown in FIG. 6, in the two-step RACH procedure, the MSG A may include a both a preamble (e.g., PRACH) and a payload (e.g., DMRS and PUSCH). The BS 110a attempts to decode the process/decode the MSG A preamble and payload and then sends the MSG B (e.g., based on the MSG A processing). As shown in FIG. 5, the MSG B may include both the PDCCH and PDSCH.

Figure 7A:
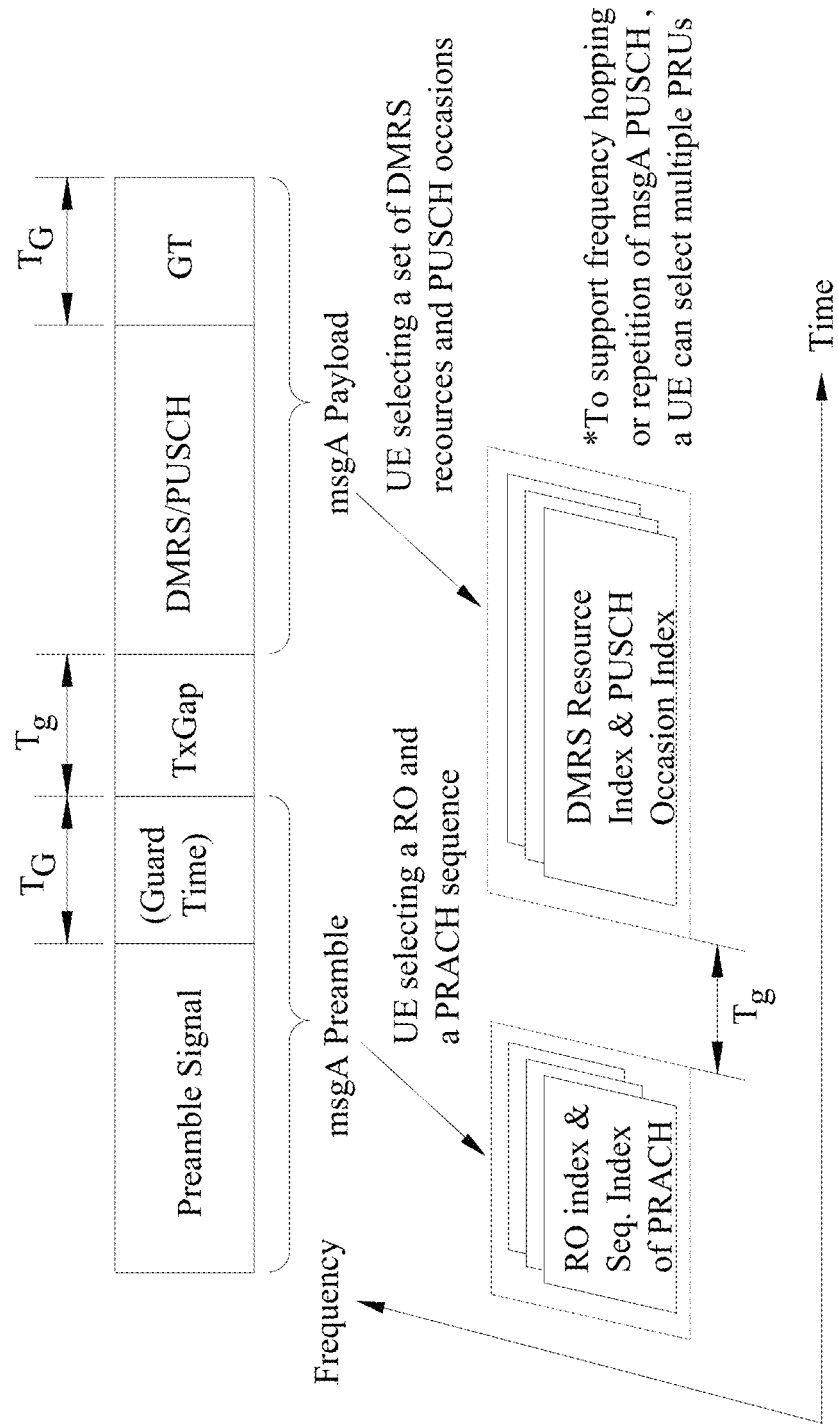
FIG. 7A illustrates a channel structure for MSG A, in accordance with certain aspects of the present disclosure.
Figure 7B:
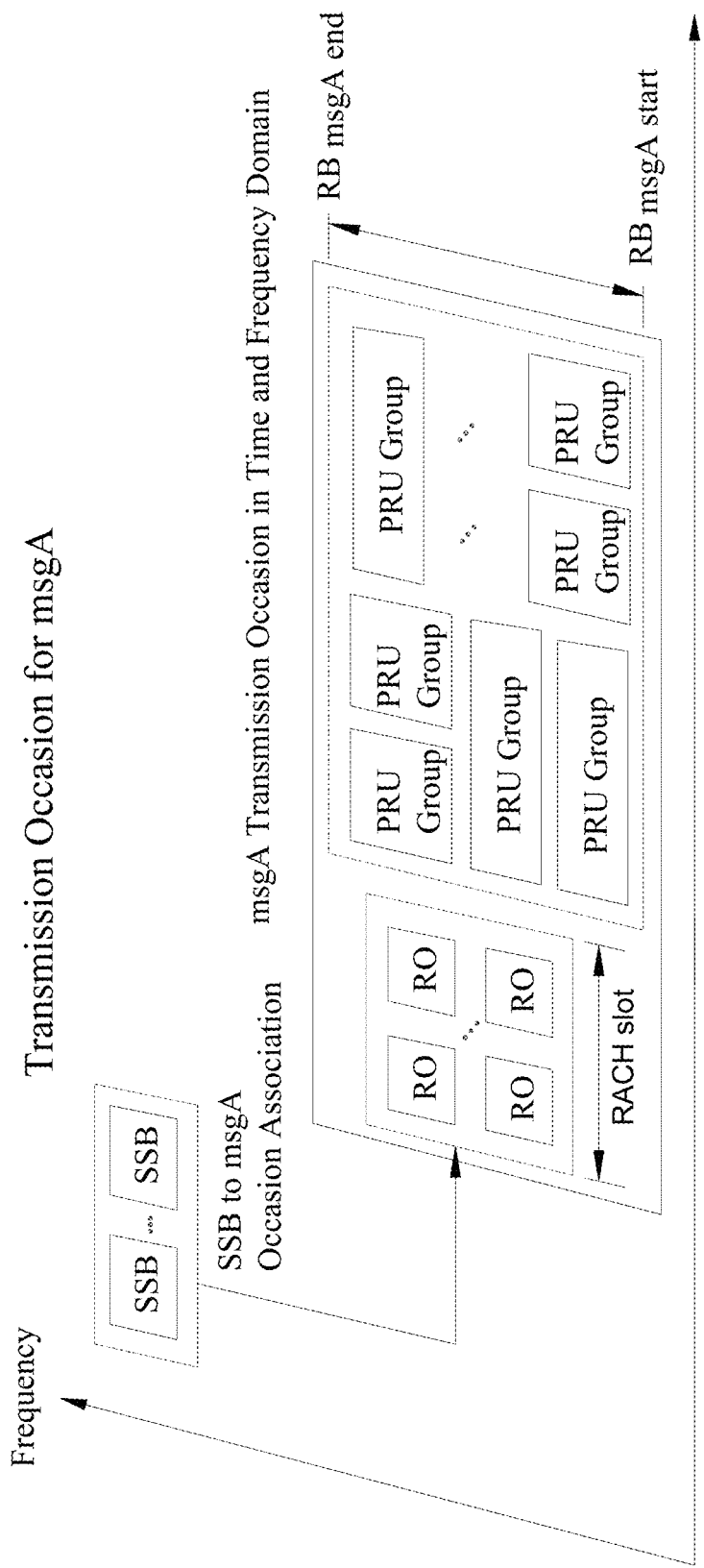
FIG. 7B illustrate a transmission occasion for MSG A, in accordance with certain aspects of the present disclosure.

FIG. 7A illustrates the channel structure for an example MSG A transmission occasion that may be validated, in accordance with certain aspects of the present disclosure. As shown in FIG. 7A, the MSG A transmission occasion generally includes a MSG A preamble occasion (for transmitting a preamble signal) and a MSG A payload occasion for transmitting a PUSCH. As illustrated in FIG. 7A, the MSG A preamble transmission may involve selection of a preamble sequence; and selection of a preamble occasion in time/frequency domain (e.g., for transmitting the selected preamble sequence). The MSG A payload transmission may involve: construction of the random access message payload (DMRS/PUSCH); and selection of one or multiple PUSCH resource units (PRUs) in time/frequency domain to transmit this message (e.g., the payload). As illustrated in FIG. 7B, the UE monitors SSB transmissions which are sent (e.g., sent repeatedly by the gNB using different TX beams) and are associated with a finite set of time/frequency resources defining RACH occasions (ROs) and PRUs. Upon detecting an SSB, the UE may select an RO and one or more PRUs associated with that SSB for a MSG A transmission. The finite set of ROs and PRUs may help reduce monitoring overhead (blind decodes) by the BS 110a.

In certain systems (e.g., 5G NR), up to 64 preamble sequences are configured on each RO. Multiple four-step and/or multiple two-step RACH UEs can share the same RO, and randomly select their preamble sequences from a common pool. In some examples, the network configures separate ROs for the two-step and four-step RACH UEs, or the network configures separate pools but a shared RO for the two-step and four-step RACH UEs.

Two-step RACH can support both contention-based random access (CBRA) and contention-free random access (CFRA). In some examples, in a CBRA two-step RACH procedure, a contention resolution identifier (ID) is transmitted in the payload of MSG A. In some examples, in a CFRA two-step RACH procedure, a medium access control (MAC) control element (CE) or a small data can be transmitted in the payload of MSG A.

In some examples, the contents of MSG B depends on the RRC state of the UE and the MSG A processing outcome. FIG. 8 and FIG. 9 are tables showing example contents of the RACH response message (e.g., PDCCH and PDSCH) for unicast and multicast, respectively, depending on the RRC state and whether the BS successfully decoded the RACH payload and preamble from the UE. As shown, if the BS can successfully decode the MSG A payload, the BS sends a SuccessRAR in the MSG B PDSCH. For a UE in the RRC connected state, the SuccessRAR includes at least a timing advance command (TAC). For a UE in the RRC idle/inactive state, the SuccessRAR includes at least a TAC, a contention resolution ID, and a C-RNTI. If the BS cannot decode the MSG A payload, but can detect the MSG A preamble, the BS sends a FallbackRAR in the MSG B PDSCH. The FallbackRAR includes at least a RAR grant for retransmitting PUSCH, a temporary cell radio network temporary identifier (TC-RNTI) and a TAC.

What is needed is a HARQ procedure for the RACH response message in the two-step RACH procedure.

Example HARQ Procedure for RACH Response Message in Two-Step RACH

Aspects of the present disclosure provide a hybrid automatic repeat request (HARQ) procedure for a random access channel (RACH) response message (e.g., a MSG B) in a two-step RACH procedure (e.g., such as the two-step RACH procedure described above with respect to FIGS. 5-9). The HARQ procedure may improve reliability of the two-step RACH procedure, while accommodating various user equipment (UE) radio resource control (RRC) states, various results of RACH message (e.g., MSG A) processing, flexibility of acknowledgment (ACK)/negative ACK (NACK) or discontinuous transmission (DTX) indications (e.g., which may help support asynchronous uplink communication, handover, best effort delivery of small data, and/or power savings), and both contention-based random access (CBRA) and contention-free random access (CFRA) two-step procedures.

Example HARQ Feedback for SuccessRAR:

As discussed above, when the base station (BS), such as a BS 110 illustrated in FIG. 1, successfully decodes a RACH message payload, the BS sends the RACH response message (e.g., MSG B) with a SuccessRAR in the physical downlink shared channel (PDSCH) with content that may depend on the RRC state of the UE. In some examples, for an RRC connected UE in the CBRA or CFRA mode, the SuccessRAR includes at least a timing advance command (TAC). In some examples, for an RRC idle/inactive UE in the CBRA mode, the SuccessRAR includes at least a TAC, a contention resolution identifier (ID) and a common radio network temporary identifier (C-RNTI).

If the UE successfully decodes the SuccessRAR within a random access response (RAR) window, the UE adjusts the timing offset for uplink transmission, by executing the TAC carried in the SuccessRAR. In some examples, the granularity for the TAC is based on the configured numerology for physical uplink control channel (PUCCH)/physical uplink shared channel (PUSCH) for the active uplink bandwidth part (BWP).

According to certain aspects, when the UE successfully decodes the SuccessRAR in the RACH response message within the RAR window, the UE transmits an ACK in uplink control information (UCI). If the UE has a PUCCH resource, then the UE transmits the UCI on the PUCCH. In some examples, the PUCCH resource is provided in the RACH response message. In some examples, the PUCCH resource is preconfigured in system information (SI), radio resource control (RRC) signaling, or downlink control information (DCI). In some examples, the PUCCH resource is selected by the UE. For example, the UE may select the PUCCH resource as a function of the UE's multiple access signature (e.g., a MSG A preamble ID). In some examples, if the UE has new uplink data to transmit, but does not have a valid uplink grant for the new data, the UE can multiplex a scheduling request (SR) with the ACK in the UCI to request an uplink grant for the new data. In some examples, the UCI (e.g., the ACK) can be transmitted on the PUSCH. For example, the UCI may be transmitted on the PUSCH when the UE does not have a valid PUCCH resource, but does have a valid uplink grant for new data transmission.

According to certain aspects, when the UE does not successfully decode a SuccessRAR in the RACH response message within the RAR window, then the UE may transmits NACK. If the UE has a valid PUCCH resource, then the UE may transmit the NACK on the PUCCH. In some examples, the PUCCH resource is preconfigured in SI, RRC signaling, or DCI. In some examples, the PUCCH resource is selected by the UE. For example, the UE may select the PUCCH resource as a function of the UE's multiple access signature (e.g., a MSG A preamble ID). On the other hand, if the UE does not have a valid PUCCH resource, then the UE will not transmit HARQ feedback (e.g., no NACK or ACK), which may be referred to as discontinuous transmission (DTX).

According to certain aspects, the UE can determine whether or not to provide HARQ feedback for the RACH response message further based on an indication from the BS. For example, the BS can provide the UE with a HARQ Feedback Request Indicator indicating whether or not HARQ feedback is requested/allowed. The BS may provide the indication to the UE in the PUCCH resource configuration (e.g., which may be preconfigured and/or provided in the RACH response message as discussed above). In some examples, the indication may be provided via an additional field in an ACK/NACK transmission indicator. For example, the PUCCH resource configuration for HARQ of a MSG B PDSCH may include a first field (e.g., FieldA, which may be 3 or 4 bits) with a PUCCH Resource Set Indicator and a second field (e.g., FieldB, which may be 1 or 2 bits) with the HARQ Feedback Request Indicator.

In an illustrative example of a 1-bit ACK/NACK transmission indicator in a PUCCH resource configuration: a value of "0" may indicate: OK to transmit NACK if the UE cannot decode MSG B PDSCH, regardless whether the UE has a valid timing advance (TA) or not; and a value of "1" may indicate: Do NOT transmit NACK if the UE cannot decode MSG B PDSCH, regardless whether the UE has valid TA or not. In an illustrative example of a 2-bit ACK/NACK transmission indicator in a PUCCH resource configuration: a value of "00" may indicate: OK to transmit NACK if the UE cannot decode MSG B PDSCH, regardless whether the UE has a valid TA or not; a value of "01 may indicate: OK to transmit NACK if the UE has valid TA but cannot decode MSG B PDSCH; Do NOT transmit NACK, if the UE does not have a valid TA; a value of "10" may indicate: Do NOT transmit ACK or NACK; and a value of "11" may indicate: Do NOT transmit NACK if the UE cannot decode MSG B PDSCH, regardless whether the UE has valid TA or not.

Figure 10:
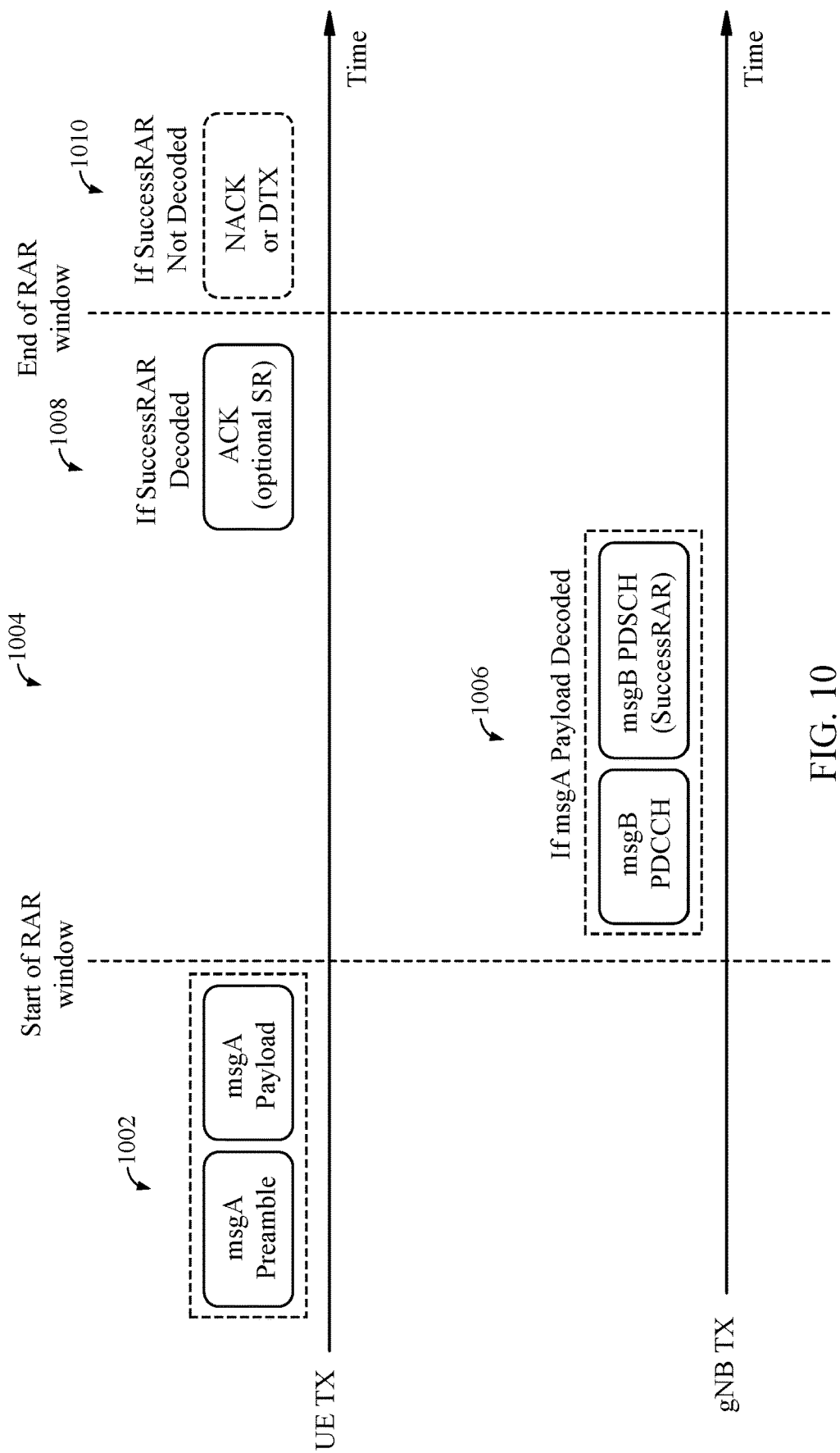
FIG. 10 is a timing diagram illustrating an example hybrid automatic repeat request (HARQ) procedure for a RACH response message with success random access response (RAR) in an example two-step RACH procedure, in accordance with certain aspects of the present disclosure.

FIG. 10 is a timing diagram illustrating an example HARQ procedure for a RACH response message with SuccessRAR in an example two-step RACH procedure, in accordance with certain aspects of the present disclosure. As shown in FIG. 10, at 1002, the UE transmits the MSG A preamble and MSG A payload (e.g., PUCCH and PUSCH for the MSG 1 of the two-step RACH procedure). The RAR window 1004 may be started at the end of the MSG A payload transmission. If the BS successfully decodes the MSG A preamble and the MSG A payload, then at 1006 the BS sends the MSG B PDCCH and the MSG B PDSCH with SuccessRAR (e.g., for the MSG 2 of the two-step RACH procedure). If the UE decodes the MSG B with the SuccessRAR, at 1008, during the RAR window 1004, then the UE sends an ACK (with may include an SR) at 1008. If the UE does not decode the SuccessRAR during the RAR window, then at 1010 the UE sends a NACK or DTX. As discussed above, the sending of the HARQ feedback for the RACH response message may be further based on an indication from the BS, such as the HARQ Feedback Request Indicator which may be included in a field in the PUCCH resource configuration.

Example HARQ Feedback for FallbackRAR:

As discussed above, when the UE transmits the MSG A preamble and MSG A payload (e.g., PUCCH and PUSCH for the MSG 1 of the two-step RACH procedure), if the BS can detect the RACH preamble but cannot decode the RACH payload, the BS sends a FallbackRAR in the RACH response message PDSCH. As discussed above, for a UE in the CBRA mode and any RRC state, the FallbackRAR includes at least a TAC, an uplink grant for PUSCH (e.g., MSG A payload) retransmission, a TC-RNTI and a RAPID. For a UE in the CFRA mode, the FallbackRAR includes at least a TAC, an uplink grant for PUSCH retransmission, and a RAPID.

When the UE successfully decodes the FallbackRAR in the RACH response message within the RAR window, the UE may adjust the uplink timing based on the TAC. According to certain aspects, the UE may not transmit an ACK (e.g., different from SuccessRAR case) for the RACH response message. Instead, the UE retransmits the PUSCH (of the MSG A) on the uplink resource granted in the FallbackRAR.

When the UE does not successfully decode the FallbackRAR in the RACH response message (e.g., does not decode the RACH response message) within the RAR window, the UE may determine whether to send HARQ feedback for the RACH response message. In some examples, the UE transmits NACK in UCI when the UE does not successfully decode a FallbackRAR in the RAR window. As discussed above, if the UE has a PUCCH resource the UE transmits the NACK on the PUCCH, where the PUCCH resource may be provided in the RACH response, preconfigured in SI, RRC signaling, or DCI, or selected by the UE (e.g., as a function of the UE's multiple access signature). On the other hand, if the UE does not have a valid PUCCH resource, then the UE will not transmit NACK (e.g., the UE will DTX).

As discussed above, the UE can determine whether or not to provide HARQ feedback for the RACH response message further based on an indication from the BS, such as the HARQ Feedback Request Indicator.

Figure 11:
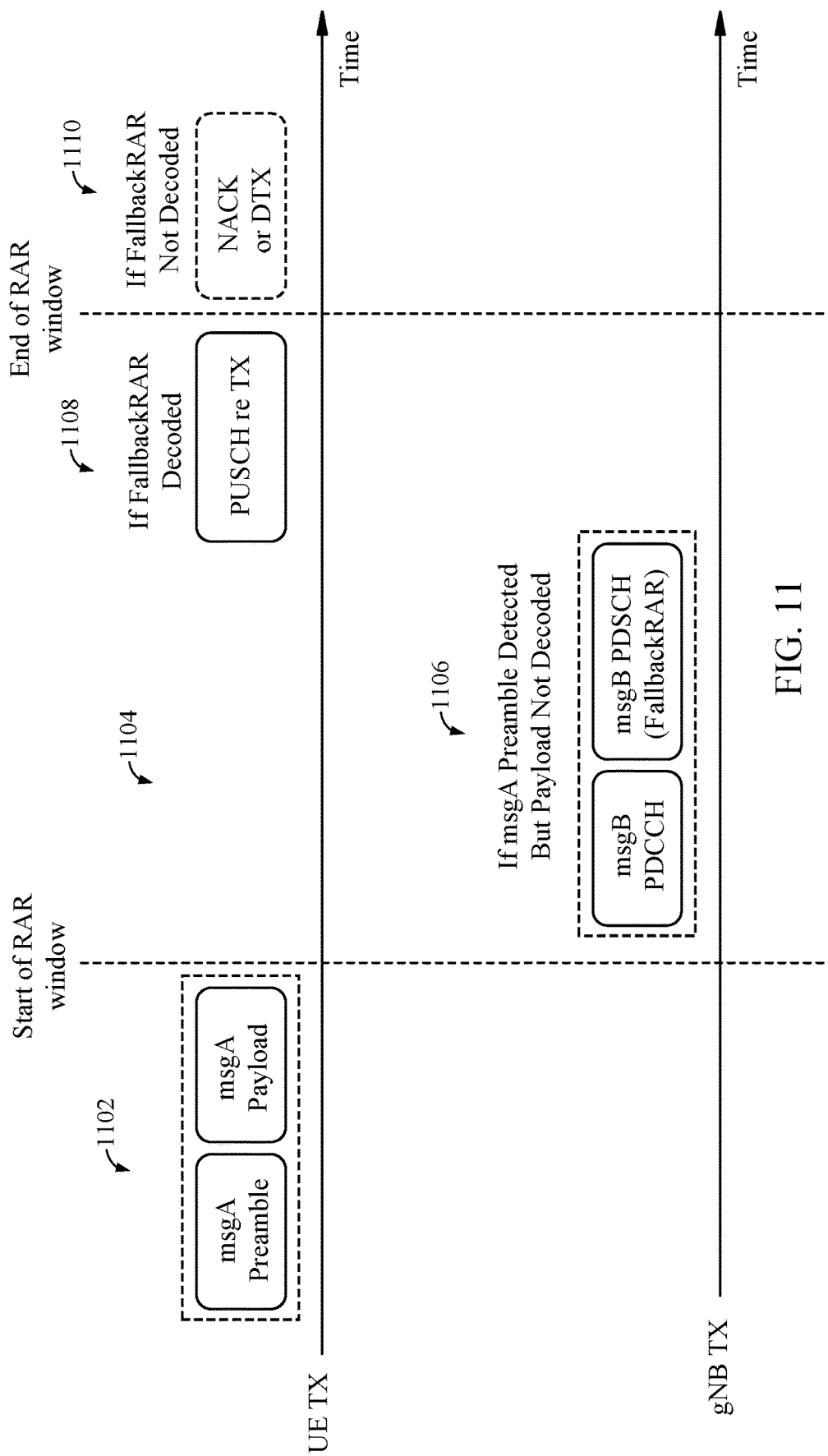
FIG. 11 is a timing diagram illustrating an example HARQ procedure for a RACH response message with fallback RAR in an example two-step RACH procedure, in accordance with certain aspects of the present disclosure.

FIG. 11 is a timing diagram illustrating an example HARQ procedure for a RACH response message with fallback RAR in an example two-step RACH procedure, in accordance with certain aspects of the present disclosure. As shown in FIG. 11, at 1102, the UE transmits the MSG A preamble and MSG A payload (e.g., PUCCH and PUSCH for the MSG 1 of the two-step RACH procedure). The RAR window 1104 may be started at the end of the MSG A payload transmission. If the BS successfully decodes the MSG A preamble and does not successfully decode the MSG A payload, then at 1106 the BS sends the MSG B PDCCH and the MSG B PDSCH with FallbackRAR (e.g., for the MSG 2 of the two-step RACH procedure). If the UE decodes the MSG B with the FallbackRAR, at 1108, during the RAR window 1104, then the UE sends a retransmission of the MSG A PUSCH at 1108. If the UE does not decode the SuccessRAR during the RAR window, then at 1110 the UE sends a NACK or DTX. As discussed above, the sending of the HARQ feedback for the RACH response message may be further based on an indication from the BS, such as the HARQ Feedback Request Indicator which may be included in a field in the PUCCH resource configuration.

Example MSG B Retransmission:

According to certain aspects, if the BS receives an ACK to the SuccessRAR, the network (e.g., the BS) will consider the two-step RACH procedure is complete for the corresponding UE. In this case, there is no more RACH response message retransmission for that UE. If the BS receives a MSG A PUSCH retransmission from the UE on granted resources (e.g., granted resources indicated in the Fallback- RAR) and there is no SR from that UE, then the network may consider the two-step RACH procedure is complete for the corresponding UE and, in this case as well, there is no more RACH response message retransmission for that UE.

According to certain aspects, if the BS receives a NACK to the RACH response message (e.g., in the UCI), the BS will retransmit the RACH response message RAR (e.g., with the SucessRAR or FallbackRAR) to the corresponding UE(s) within a pre-defined time interval. As mentioned above, the PUCCH resource may be selected by the UE based on the multiple access signature of UE (e.g., the MSG A preamble ID). In this case, the BS can detect the sender's identity (e.g., detect which UE did not decode MSG B PDSCH), based at least on the PUCCH resource configuration.

According to certain aspects, if the BS does not receive HARQ feedback (e.g., an ACK or NACK) for the RACH response message PDSCH, such as in the case of DTX by the UE, then the BS retransmits the RACH response message SuccessRAR/FallbackRAR. For example, the BS may retransmit after a pre-defined timer for ACK/NACK monitoring expires. In some examples, the retransmits if a counter for MSG B retransmissions is equal to or less than a maximum number of retransmissions configured by the network. The BS aborts retransmissions if the counter for MSG B retransmissions exceeds the maximum number of retransmissions configured by NW or if a counter for timing advance expires.

Figure 12:
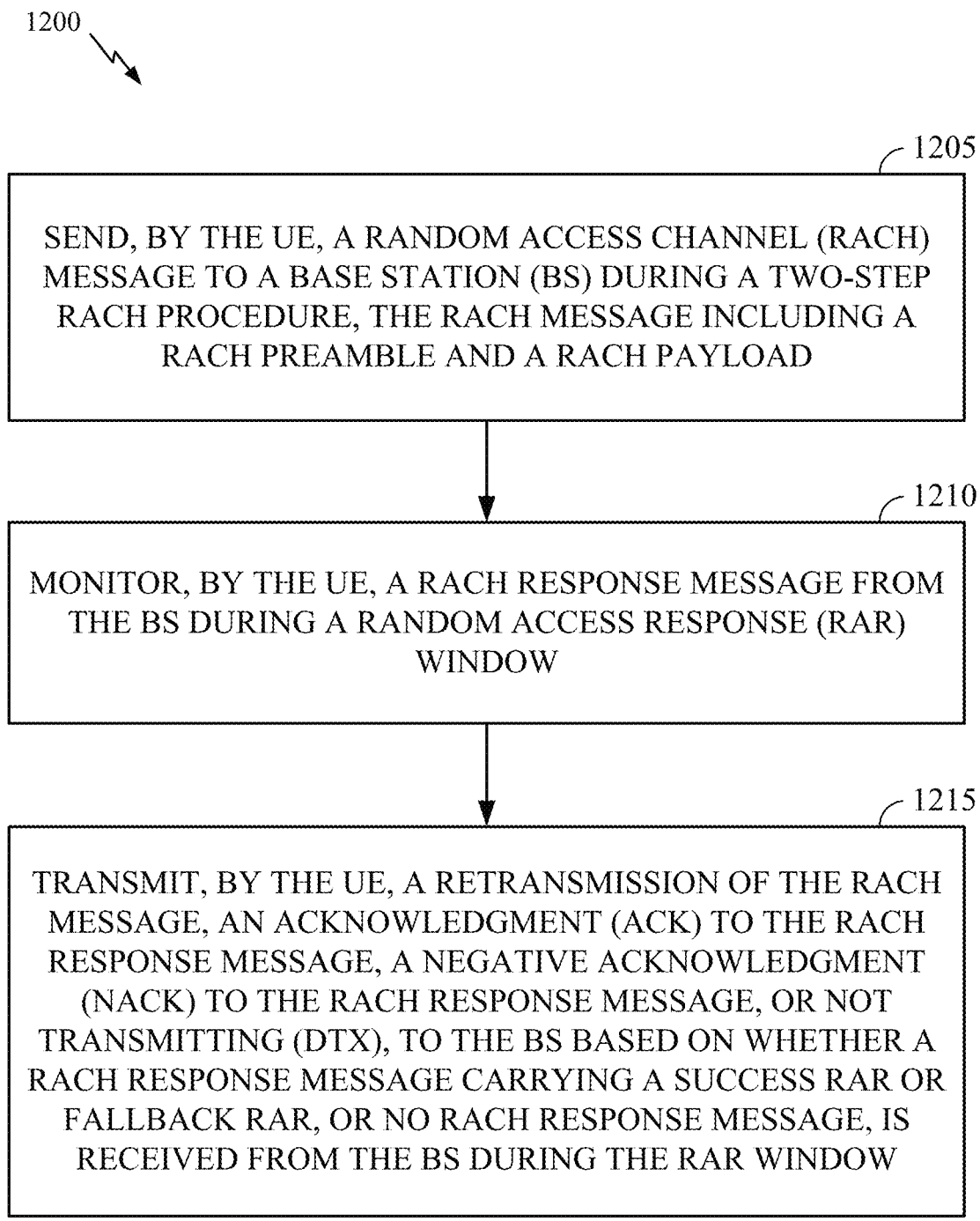
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., such as a UE 120a in the wireless communication network 100). Operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at 1205, by sending a RACH message to a BS during a two-step RACH procedure, the RACH message including a RACH preamble and a RACH payload.

At 1210, the UE monitors a RACH response message from the BS during a RAR window.

At 1215, the UE transmits a retransmission of the RACH message, an ACK to the RACH response message, a NACK to the RACH response message, or DTX, to the BS based on whether a RACH response message carrying a success RAR or fallback RAR, or no RACH response message, is received from the BS during the RAR window.

In a first aspect, the UE is in a CFRA mode or a CBRA mode; and the UE in a RRC idle, RRC inactive, or RRC connected state.

In a second aspect, alone or in combination with the first aspect, the RACH preamble comprises a PRACH carrying a RACH sequence; the RACH payload comprises a DMRS and a PUSCH carrying: a MAC control element (MAC CE) or small data when the UE is in a CFRA mode; and a contention resolution ID when the UE is in a CBRA mode.

In a third aspect, alone or in combination with one or more of the first aspect and second aspects, the RACH response message comprises a PDCCH; the RACH response message comprises a PDSCH carrying the success RAR or fallback RAR, the success RAR or fallback RAR including at least a TAC; and the method further comprises adjusting a timing offset for uplink transmissions based on a TAC.

In a fourth aspect, alone or in combination with one or more of the first through third aspects, a granularity of the TAC is based on a numerology configured for a data or a control channel in an active uplink BWP.

In a fifth aspect, alone or in combination with one or more of the first through fourth aspects, the success RAR further comprises a contention resolution ID and a UE ID when the UE is in a RRC idle or inactive state and is in the CBRA mode.

In a sixth aspect, alone or in combination with one or more of the first through fifth aspects, the fallback RAR further comprises a RAR grant for retransmission, and a RAPID.

In a seventh aspect, alone or in combination with one or more of the first through sixth aspects, the fallback RAR further comprises a TC-RNTI when the UE is in a CBRA mode.

In an eighth aspect, alone or in combination with one or more of the first through seventh aspects, the ACK or retransmission is transmitted within the RAR window.

In a ninth aspect, alone or in combination with one or more of the first through eighth aspects, the NACK or DTX is after the RAR window.

In a tenth aspect, alone or in combination with one or more of the first through ninth aspects, the transmitting comprises transmitting the ACK in UCI when the UE receives the RACH response message carrying the success RAR during the RAR window.

In an eleventh aspect, alone or in combination with one or more of the first through tenth aspects, the ACK is transmitted on a preconfigured PUCCH resource.

In a twelfth aspect, alone or in combination with one or more of the first through eleventh aspects, the PUCCH resource is preconfigured via SI, RRC, or DCI.

In a thirteenth aspect, alone or in combination with one or more of the first through twelfth aspects, the ACK is transmitted is multiplexed with a SR in the UCI when the UE has new uplink data to transmit and does not have a valid uplink grant for the new data.

In a fourteenth aspect, alone or in combination with one or more of the first through thirteenth aspects, the ACK is multiplexed on a PUSCH when the UE does not have a valid configured PUCCH resource and has a valid uplink grant for new data transmission on the PUSCH.

In a fifteenth aspect, alone or in combination with one or more of the first through fourteenth aspects, the transmitting comprises retransmitting a PUSCH of the RACH message when the UE receives the RACH response message carrying the fallback RAR during the RAR window.

In a sixteenth aspect, alone or in combination with one or more of the first through fifteenth aspects, the PUSCH is retransmitted on a resource granted in the fallback RAR.

In a seventeenth aspect, alone or in combination with one or more of the first through sixteenth aspects, the transmitting comprises transmitting the NACK when the UE does not successfully decode the RACH response message during the RAR window and the UE has a valid PUCCH resource.

In an eighteenth aspect, alone or in combination with one or more of the first through seventeenth aspects, the method further comprises selecting the PUCCH resource based on a multiple access signature of the UE.

In a nineteenth aspect, alone or in combination with one or more of the first through eighteenth aspects, the not transmitting comprises DTX when the UE does not successfully decode the RACH response message during the RAR window and the UE does not have a valid PUCCH resource.

In a twentieth aspect, alone or in combination with one or more of the first through nineteenth aspects, the transmitting ACK or NACK, or DTX, is based at least in part on an indication from the BS indicating whether HARQ feedback is requested.

In a twenty-first aspect, alone or in combination with one or more of the first through twentieth aspects, the indication is provided via 1 or 2 bits with a PUCCH resource configuration.

In a twenty-second aspect, alone or in combination with one or more of the first through twenty-first aspects, the 1-bit indication indicates whether or not to provide HARQ feedback; and the 2-bit indication indicates whether or not to provide HARQ feedback based on whether the UE has a valid TA.

In a twenty-third aspect, alone or in combination with one or more of the first through twenty-second aspects, the method further comprises receiving a retransmitted RACH response message from the BS in response to transmitting a NACK.

Figure 13:
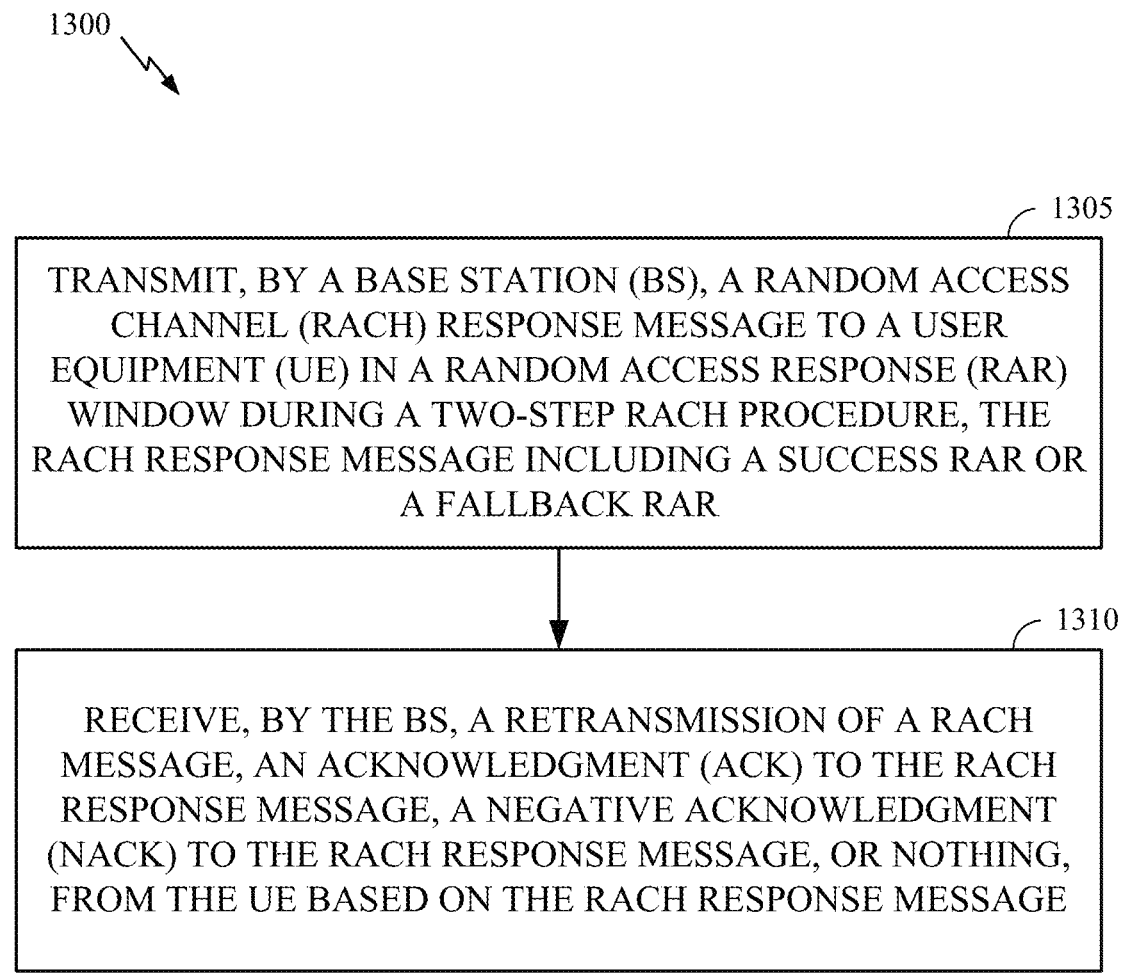
FIG. 13 is a flow diagram illustrating example operations for wireless communication by a BS, in accordance with certain aspects of the present disclosure.

In a twenty-fourth aspect, alone or in combination with one or more of the first through twenty-third aspects, the method further comprises receiving a retransmitted RACH response message from the BS after a duration in which the UE does not send an ACK, NACK, or retransmission to the BS FIG. 13 is a flow diagram illustrating example operations 1300 for wireless communication, in accordance with certain aspects of the present disclosure. The operations 1300 may be performed, for example, by a BS (e.g., such as the BS 110a in the wireless communication network 100). The operations 1300 may be complimentary operations by the BS to the operations 1300 performed by the UE. Operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at 1305, by transmitting a RACH response message to a UE in a RAR window during a two-step RACH procedure, the RACH response message including a success RAR or a fallback RAR.

At 1310, the BS receives a retransmission of a RACH message, an ACK to the RACH response message, a NACK to the RACH response message, or nothing, from the UE based on the RACH response message.

In a first aspect, the method further comprises determining the UE is in a CFRA mode or a CBRA mode; and determining the UE in a RRC idle, RRC inactive, or RRC connected state.

In a second aspect, alone or in combination with the first aspect, the method further comprises monitoring the RACH message, the RACH message including a RACH preamble comprising a PRACH carrying a RACH sequence and a RACH payload comprising a DMRS and a PUSCH carrying: a MAC control element (MAC CE) or small data when the UE is in a CFRA mode; and a contention resolution ID when the UE is in a CBRA mode.

In a third aspect, alone or in combination with one or more of the first aspect and second aspects, the RACH response message comprises a PDCCH; and the RACH response message comprises a PDSCH carrying the success RAR or fallback RAR, the success RAR or fallback RAR including at least a TAC.

In a fourth aspect, alone or in combination with one or more of the first through third aspects, a granularity of the TAC is based on a numerology configured for a data or a control channel in an active uplink BWP.

In a fifth aspect, alone or in combination with one or more of the first through fourth aspects, the success RAR further comprises a contention resolution ID and a UE ID when the UE is in a RRC idle or RRC inactive state and is in the CBRA mode.

In a sixth aspect, alone or in combination with one or more of the first through fifth aspects, the fallback RAR further comprises a RAR grant for retransmission, and a RAPID.

In a seventh aspect, alone or in combination with one or more of the first through sixth aspects, the fallback RAR further comprises a TC-RNTI when the UE is in a CBRA mode.

In an eighth aspect, alone or in combination with one or more of the first through seventh aspects, the ACK or retransmission is received within the RAR window.

In a ninth aspect, alone or in combination with one or more of the first through eighth aspects, the NACK or DTX is after the RAR window.

In a tenth aspect, alone or in combination with one or more of the first through ninth aspects, the ACK is received in UCI in response to the success RAR.

In an eleventh aspect, alone or in combination with one or more of the first through tenth aspects, the ACK is received on a preconfigured PUCCH resource.

In a twelfth aspect, alone or in combination with one or more of the first through eleventh aspects, the method further comprises preconfiguring the PUCCH resource via SI, RRC signaling, or DCI.

In a thirteenth aspect, alone or in combination with one or more of the first through twelfth aspects, the ACK is multiplexed with a SR in the UCI.

In a fourteenth aspect, alone or in combination with one or more of the first through thirteenth aspects, the ACK is multiplexed on a PUSCH.

In a fifteenth aspect, alone or in combination with one or more of the first through fourteenth aspects, the receiving comprises receiving the retransmission of a PUSCH of the RACH message in response to the fallback RAR.

In a sixteenth aspect, alone or in combination with one or more of the first through fifteenth aspects, the retransmission of the PUSCH is received on a resource granted in the fallback RAR.

In a seventeenth aspect, alone or in combination with one or more of the first through sixteenth aspects, the method further comprises providing an indication to the UE indicating whether HARQ feedback is requested for the RACH response message.

In an eighteenth aspect, alone or in combination with one or more of the first through seventeenth aspects, the indication is provided via 1 or 2 bits with a PUCCH resource configuration.

In a nineteenth aspect, alone or in combination with one or more of the first through eighteenth aspects, the 1-bit indication indicates whether or not to provide HARQ feedback; and the 2-bit indication indicates whether or not to provide HARQ feedback based on whether the UE has a valid TA.

In a twentieth aspect, alone or in combination with one or more of the first through nineteenth aspects, the method further comprises retransmitting the RACH response message to the UE in response to receiving the NACK.

In a twenty-first aspect, alone or in combination with one or more of the first through twentieth aspects, the method further comprises retransmitting the RACH response message in response to a duration in which the UE does not send an ACK, NACK, or retransmission to the BS after transmitting the RACH response message.

Figure 14:
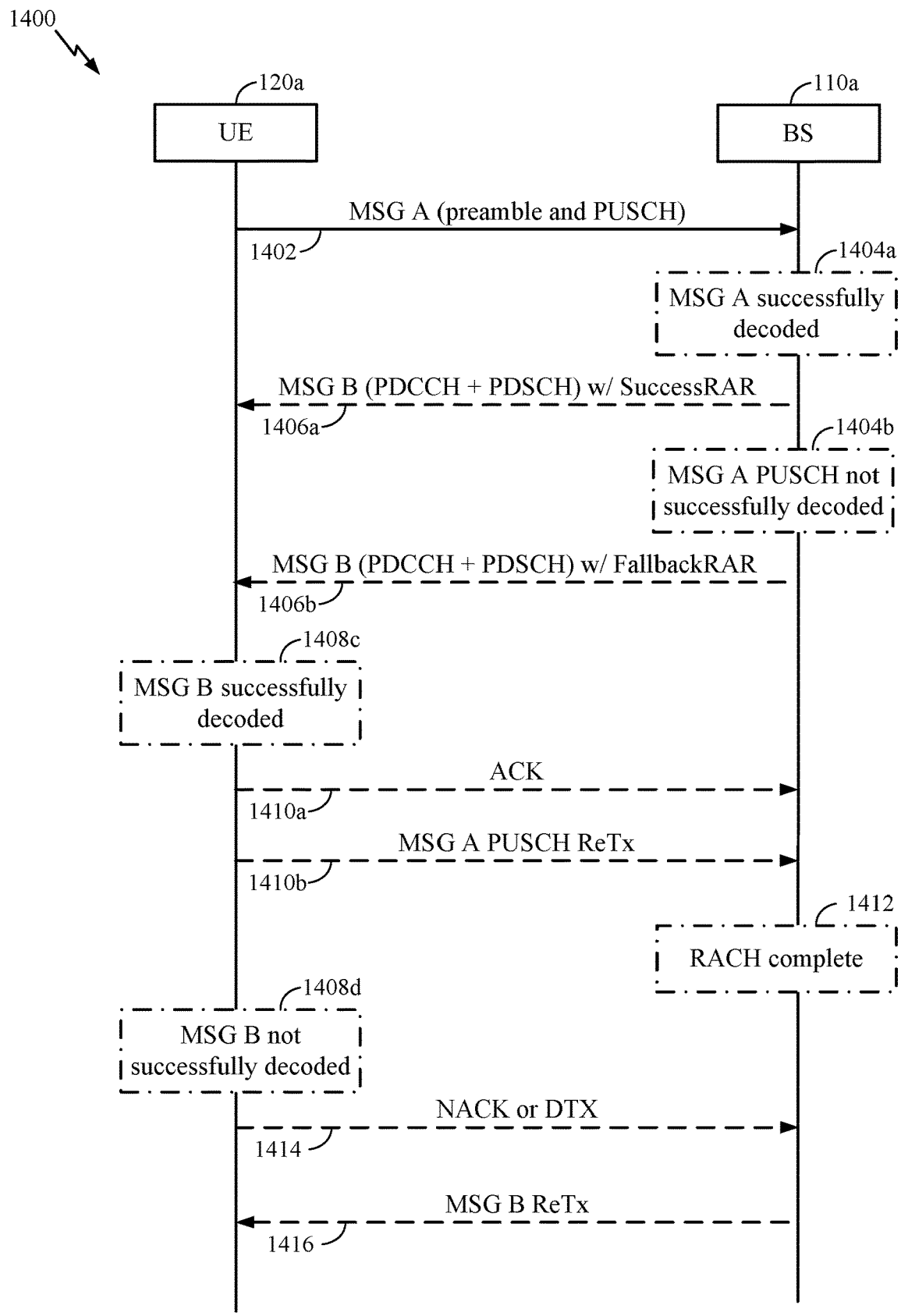
FIG. 14 is a call flow diagram illustrating example operations for a HARQ procedure in a two-step procedure, in accordance with certain aspects of the present disclosure.

FIG. 14 is a call flow diagram illustrating example operations for a HARQ procedure in a two-step procedure 1400, in accordance with certain aspects of the present disclosure. As shown at 1402, the UE 120a sends the MSG A (e.g., the preamble and PUSCH) to the BS 110a. If the BS 110a successfully decodes the MSG A (e.g., the preamble and the PUSCH) at 1404a, then at 1406a the BS 110a sends the MSG B (e.g., PDCCH and PDSCH) to the UE 120a and includes the SuccessRAR (e.g., in the PDSCH). Alternatively, if the BS 110a does successfully decodes the MSG A (e.g., does not successfully decode the PUSCH) at 1404b, then at 1406b the BS 110a sends the MSG B (e.g., PDCCH and PDSCH) to the UE 120a and includes the FallbackRAR (e.g., in the PDSCH). If the UE 120a successfully decodes the MSG B at 1408c, then the UE 120a sends an ACK (in the case of the SuccessRAR) at 1410a or sends a retransmission of the MSG A PUSCH (in the case of the Fallback-RAR) at 1410b. Once the ACK or MSG A PUSCH retransmission is received by the BS 110a, the two-step RACH procedure is considered complete, at 1412. Alternatively, if the MSG B is not successfully decoded, at 1408d, then at 1414 the UE 120a sends a NACK (if there is a HARQ resource available) or DTX (if there is no resource for HARQ feedback). When the BS 110a receives the NACK or DTX, the BS 110a retransmits the MSG B to the UE 120a at 1416. As discussed above, the sending of HARQ feedback (e.g., ACK or NACK) may be further based on whether the UE 120a is configured/indicated for providing HARQ feedback by the HARQ feedback indicator in the PUCCH resource configuration.

Figure 15:
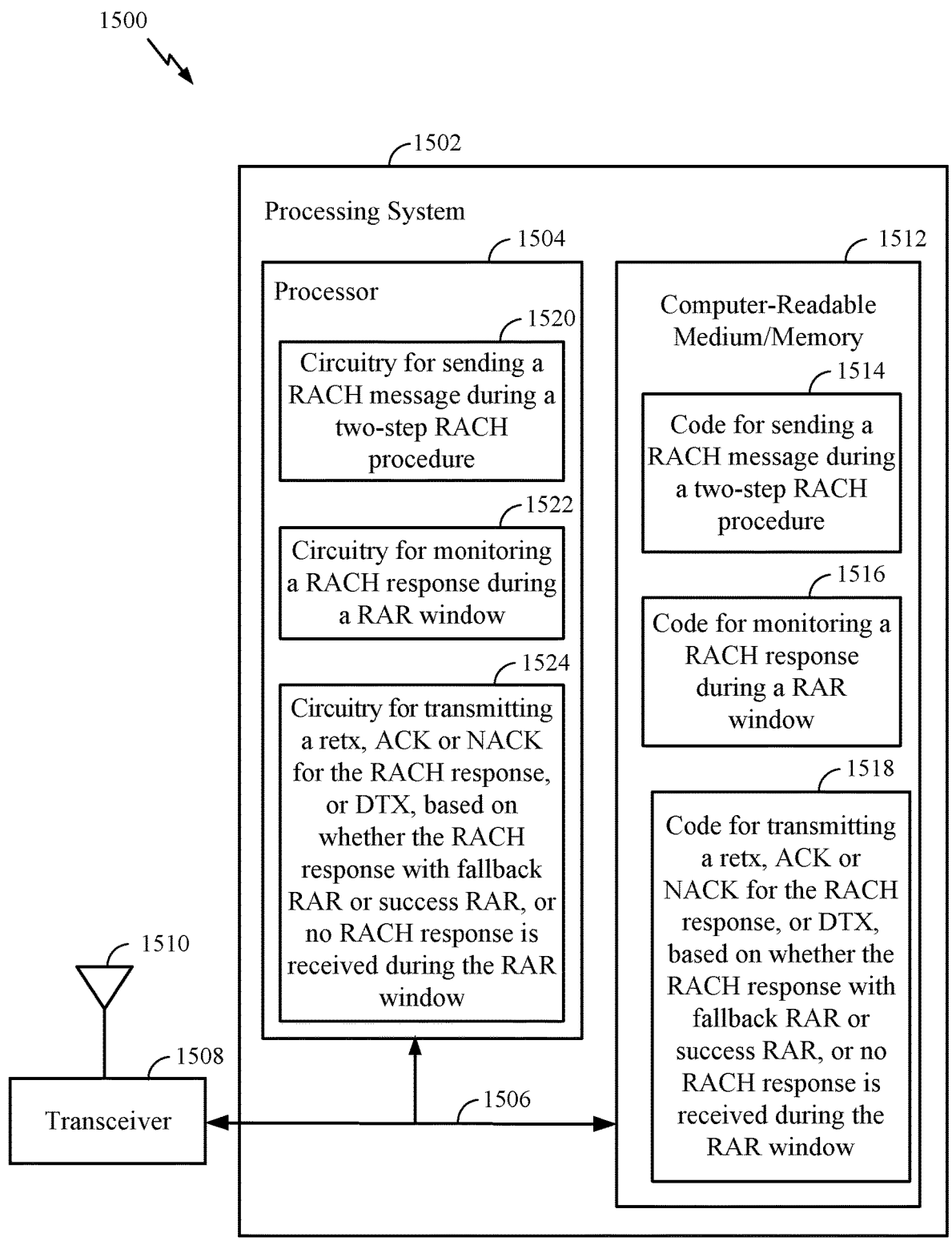
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for a HARQ procedure for the RACH response message in a two-step RACH procedure. In certain aspects, computer-readable medium/memory 1512 stores code 1514 for sending a RACH message during a two-step RACH procedure; code 1516 for monitoring a RACH response during a RAR window; and code 1518 for transmitting a retransmission, ACK, or NAK for the RACH response, or not transmitting (DTX), based on whether the RACH response with a fallback RAR, success RAR, or no RACH response, is received during the RAR window, in accordance with aspects of the present disclosure. In certain aspects, the processor 1504 has circuitry configured to implement the code stored in the computer-readable medium/memory 1512. The processor 1504 includes circuitry 1520 for sending a RACH message during a two-step RACH procedure; circuitry 1522 for monitoring a RACH response during a RAR window; and circuitry 1524 for transmitting a retransmission, ACK, or NAK for the RACH response, or not transmitting (DTX), based on whether the RACH response with a fallback RAR, success RAR, or no RACH response, is received during the RAR window, in accordance with aspects of the present disclosure.

Figure 16:
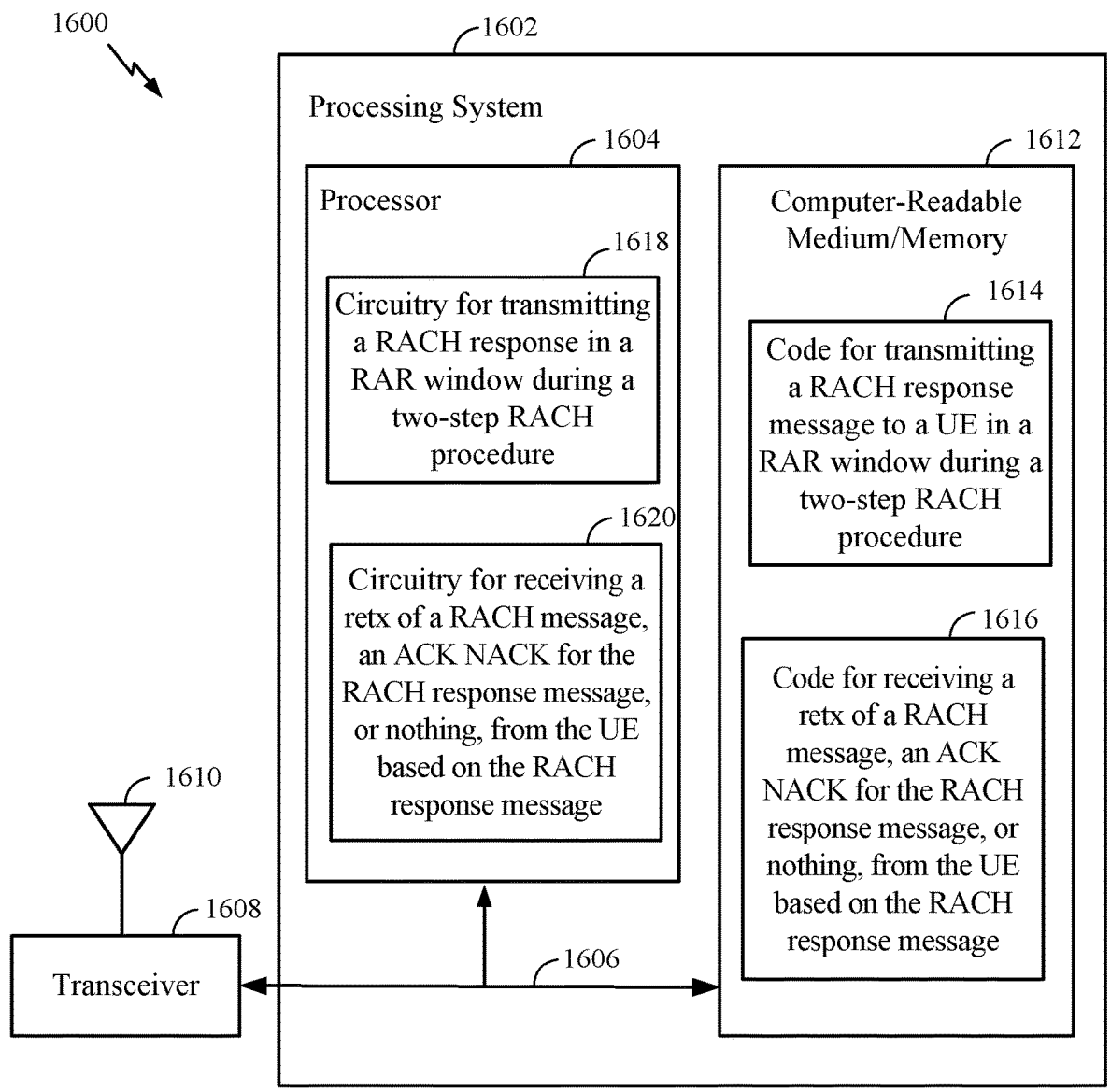
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 13. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 13, or other operations for performing the various techniques discussed herein for a HARQ procedure for the RACH response message in a two-step RACH procedure. In certain aspects, computer-readable medium/memory 1612 stores code 1614 for transmitting a RACH response message to a UE in a RAR window during a two-step RACH procedure, the RACH response message including a success RAR or a fallback RAR; and code 1616 receiving a retransmission of a RACH message, an ACK to the RACH response message, a NACK to the RACH response message, or nothing, from the UE based on the RACH response message, in accordance with aspects of the present disclosure. In certain aspects, the processor 1604 has circuitry configured to implement the code stored in the computer-readable medium/memory 1612. The processor 1604 includes circuitry 1618 for transmitting a RACH response message to a UE in a RAR window during a two-step RACH procedure, the RACH response message including a success RAR or a fallback RAR; and circuitry 1620 receiving a retransmission of a RACH message, an ACK to the RACH response message, a NACK to the RACH response message, or nothing, from the UE based on the RACH response message, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 12 and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), the method comprising:
   sending a random access channel (RACH) message during a two-step RACH procedure, the RACH message including a RACH preamble and a RACH payload;
   monitoring for a RACH response message during a random access response (RAR) window;
   receiving a physical downlink control channel (PDCCH) of the RACH response message, wherein the PDCCH of the RACH response message includes a field indicating whether hybrid automatic repeat request (HARQ) feedback is requested for a physical downlink shared channel (PDSCH) of the RACH response message; and one of:
   if the UE successfully decodes the PDSCH of the RACH response message during the RAR window:
      transmitting an acknowledgement (ACK) to the RACH response message if the PDSCH of the RACH response message is carrying a success RAR during the RAR window and the field in the PDCCH of the RACH response message indicates that HARQ feedback is requested for the PDSCH of the RACH response message; or
      transmitting a retransmission of the RACH payload of the RACH message on a physical uplink shared channel (PUSCH) if the PDSCH of the RACH response message is carrying a fallback RAR; and
   if the UE does not successfully decode the PDSCH of the RACH response message during the RAR window:
      transmitting a negative acknowledgment (NACK) to the RACH response message if the field in the PDCCH of the RACH response message indicates that HARQ feedback is requested for the PDSCH of the RACH response message; or
      performing a discontinuous transmission (DTX) if the field in the PDCCH of the RACH response message indicates that HARQ feedback is not requested for the PDSCH of the RACH response message.

2. The method of claim 1, wherein the ACK is transmitted on a physical uplink control channel (PUCCH) resource.

3. The method of claim 2, wherein the PUCCH resource is provided in the RACH response message.

4. The method of claim 2, wherein the PUCCH resource is preconfigured via system information (SI), radio resource control (RRC) signaling, or downlink control information (DCI).

5. The method of claim 2, further comprising selecting the PUCCH resource based on a multiple access signature of the UE.

6. The method of claim 1, wherein the PUSCH is on a resource granted in the RACH response message carrying the fallback RAR.

7. The method of claim 1, wherein performing DTX is further if the UE does not have a valid resource for providing HARQ feedback.

8. The method of claim 1, wherein transmitting the NACK is further if the UE has a valid resource for providing HARQ feedback.

9. The method of claim 1, wherein the ACK is multiplexed with a scheduling request (SR) in uplink control information (UCI) when the UE has new uplink data to transmit and does not have a valid uplink grant for the new uplink data.

10. The method of claim 1, further comprising receiving a retransmitted RACH response message in response to transmitting the NACK or the DTX, wherein the retransmitted RACH response message includes a radio network temporary identifier (RNTI).

11. The method of claim 1, wherein the ACK is multiplexed on a PUSCH when the UE does not have a valid configured physical uplink control channel (PUCCH) resource and has a valid uplink grant for new data transmission on the PUSCH.

12. The method of claim 1, wherein:
   the RACH response message includes at least a timing advance command (TAC); and
   the method further comprises adjusting a timing offset for uplink transmissions based on the TAC.

13. The method of claim 12, wherein a granularity of the TAC is based on a numerology configured for a data channel or a control channel in an active uplink bandwidth part (BWP).

14. The method of claim 1, wherein the RACH response message further includes a contention resolution identifier (ID) and a UE ID when the UE is in a radio resource control (RRC) idle or inactive state and is in a contention based random access (CBRA) mode.

15. The method of claim 1, wherein the RACH response message with fallback RAR further includes a RACH preamble identifier (RAPID).

16. The method of claim 1, wherein the RACH response message with fallback RAR further includes a temporary cell radio network temporary identifier (TC-RNTI) when the UE is in a contention based random access (CBRA) mode.

17. The method of claim 1, wherein the field indicating whether HARQ feedback is requested for the PDSCH of the RACH response message is provided via 1 or 2 bits in the PDCCH of the RACH response message in a physical uplink control channel (PUCCH) resource configuration further including a PUCCH resource set indicator field.

18. The method of claim 17, wherein:
the field is 1-bit and indicates to provide NACK feedback regardless whether the UE has a valid timing advance (TA) or not to provide NACK feedback regardless whether the UE has a valid TA; or
the field is 2-bits and indicates to provide NACK feedback regardless whether the UE has a valid, to provide NACK feedback only if the UE has a valid TA, not to provide HARQ feedback regardless whether the UE has a valid TA, or not to provide NACK feedback regardless whether the UE has a valid TA.

19. The method of claim 1, wherein:
the UE is in a contention free random access (CFRA) mode or a contention based random access (CBRA) mode; and
the UE in a radio resource control (RRC) idle, inactive, or connected state.

20. The method of claim 1, wherein:
the RACH preamble comprises a physical random access channel (PRACH) carrying a RACH sequence;
the RACH payload comprises a demodulation reference signal (DMRS) and a physical uplink shared channel (PUSCH) carrying:
a medium access control (MAC) control element or small data when the UE is in a contention free random access (CFRA) mode; and
a contention resolution identifier (ID) when the UE is in a contention based random access (CBRA) mode.

21. An apparatus for wireless communication, the apparatus comprising:
at least one processor; and
a memory coupled to the at least one processor, the memory comprising code executable by the at least one processor to, individually or collectively, cause the apparatus to:
send a random access channel (RACH) message during a two-step RACH procedure, the RACH message including a RACH preamble and a RACH payload;
monitor a RACH response message during a random access response (RAR) window;
receive a physical downlink control channel (PDCCH) of the RACH response message, wherein the PDCCH of the RACH response message includes a field indicating whether hybrid automatic repeat request (HARQ) feedback is requested for a physical downlink shared channel (PDSCH) of the RACH response message;
if the apparatus successfully decodes the PDSCH of the RACH response message during the RAR window:
transmit an acknowledgement (ACK) to the RACH response message if the RACH response message is carrying a success RAR and the field in the PDCCH of the RACH response message indicates that HARQ feedback is requested for the PDSCH of the RACH response message; and
transmit a retransmission of the RACH payload of the RACH message on a physical uplink shared channel (PUSCH) if the RACH response message is carrying the fallback RAR during the RAR window; and
if the apparatus successfully decodes the PDSCH of the RACH response message during the RAR window:
transmit a negative acknowledgment (NACK) to the RACH response message if the field in the PDCCH of the RACH response message indicates that HARQ feedback is requested for the PDSCH of the RACH response message; and
perform a discontinuous transmission (DTX) if the field in the PDCCH of the RACH response message indicates that HARQ feedback is not requested for the PDSCH of the RACH response message.

22. A non-transitory computer readable medium storing computer executable code thereon for wireless communication by a user equipment (UE), the computer executable code comprising:
code for sending a random access channel (RACH) message during a two-step RACH procedure, the RACH message including a RACH preamble and a RACH payload;
code for monitoring a RACH response message during a random access response (RAR) window;
code for receiving a physical downlink control channel (PDCCH) of the RACH response message, wherein the PDCCH of the RACH response message includes a field indicating whether hybrid automatic repeat request (HARQ) feedback is requested for a physical downlink shared channel (PDSCH) of the RACH response message;
code for transmitting an acknowledgement (ACK) to the RACH response message if the UE successfully decodes the PDSCH of the RACH response message carrying a success RAR during the RAR window and the field in the PDCCH of the RACH response message indicates that HARQ feedback is requested for the PDSCH of the RACH response message;
code for transmitting a negative acknowledgment (NACK) to the RACH response message if the UE does not successfully decodes the PDSCH of the RACH response message during the RAR window and the field in the PDCCH of the RACH response message indicates that HARQ feedback is requested for the PDSCH of the RACH response message;
code for performing a discontinuous transmission (DTX) if the UE does not successfully decode the PDSCH of the RACH response message during the RAR window and the field in the PDCCH of the RACH response message indicates that HARQ feedback is not requested for the PDSCH of the RACH response message; and
code for transmitting a retransmission of the RACH payload of the RACH message on a physical uplink shared channel (PUSCH) if the UE successfully decodes the PDSCH of the RACH response message carrying a fallback RAR during the RAR window.

* * * * *